United States Patent [19]
Goater

[11] Patent Number: 5,419,425
[45] Date of Patent: May 30, 1995

[54] APPARATUS AND METHOD FOR LOADING LUMBER ONTO A HIGH-SPEED LUGGED TRANSFER DECK

[76] Inventor: George H. Goater, 7491 Crawford Drive, Delta, British Columbia, Canada, V4C 6X8

[21] Appl. No.: 139,039

[22] Filed: Oct. 21, 1993

[51] Int. Cl.⁶ .................................................. B65G 47/31
[52] U.S. Cl. ................................ 198/461.3; 198/463.4
[58] Field of Search .................. 198/419.1, 419.2, 459, 198/460, 461, 464.1, 463.4

[56] References Cited

U.S. PATENT DOCUMENTS

| | | | |
|---|---|---|---|
| 2,649,951 | 8/1953 | Sandberg | 198/463.4 |
| 3,575,278 | 4/1971 | Hoffmann | 198/461 X |
| 3,830,355 | 8/1974 | Verjux | 198/461 X |
| 4,109,780 | 8/1978 | Halsey | 198/463.4 |
| 4,294,344 | 10/1981 | Van Maanen | 198/461 |
| 4,753,335 | 6/1988 | Goater | 198/456 |
| 4,869,360 | 9/1989 | Brown et al. | 198/463.4 X |
| 5,287,954 | 2/1994 | Draghetti | 198/461 |

Primary Examiner—James R. Bidwell
Attorney, Agent, or Firm—Oyen Wiggs Green & Mutala

[57] ABSTRACT

A lumber lug loader for placing boards onto a lugged transfer deck is disclosed. The lug loader has a lower board accelerating deck and an upper board-contacting member. The lower board accelerating deck and the upper board-contacting member have driven moving surfaces which can be clamped against the board from above and below. Because the boards are clamped while they are being accelerated to the speed of the lugged transfer deck, the boards can be subjected to high acceleration without excessive slipping or significant damage to the boards. The boards are accelerated smoothly and quickly. This design therefore allows for operation at higher speeds than is possible with previous lug loaders. The lug loader also provides a movable overhead stop. In operation, boards are accumulated on a smooth transfer deck behind the stop. When a board is present at the stop and a row of lugs on the lugged transfer deck is approaching the correct position for loading the stop is retracted and the moving surfaces of the upper and lower board-contacting members are brought into forcible contact with the board. The board is accelerated between the upper and lower board-contacting members. After the board is accelerated it is carried to and deposited on the lugged transfer deck. While the board is being accelerated the stop is put in place behind the board. The cycle is repeated each time a row of lugs on the lugged transfer deck passes. This accomplishes reliable high speed loading of individual pieces of lumber (singulating), onto the lugged transfer deck, at the correct position relative to the lug.

40 Claims, 18 Drawing Sheets

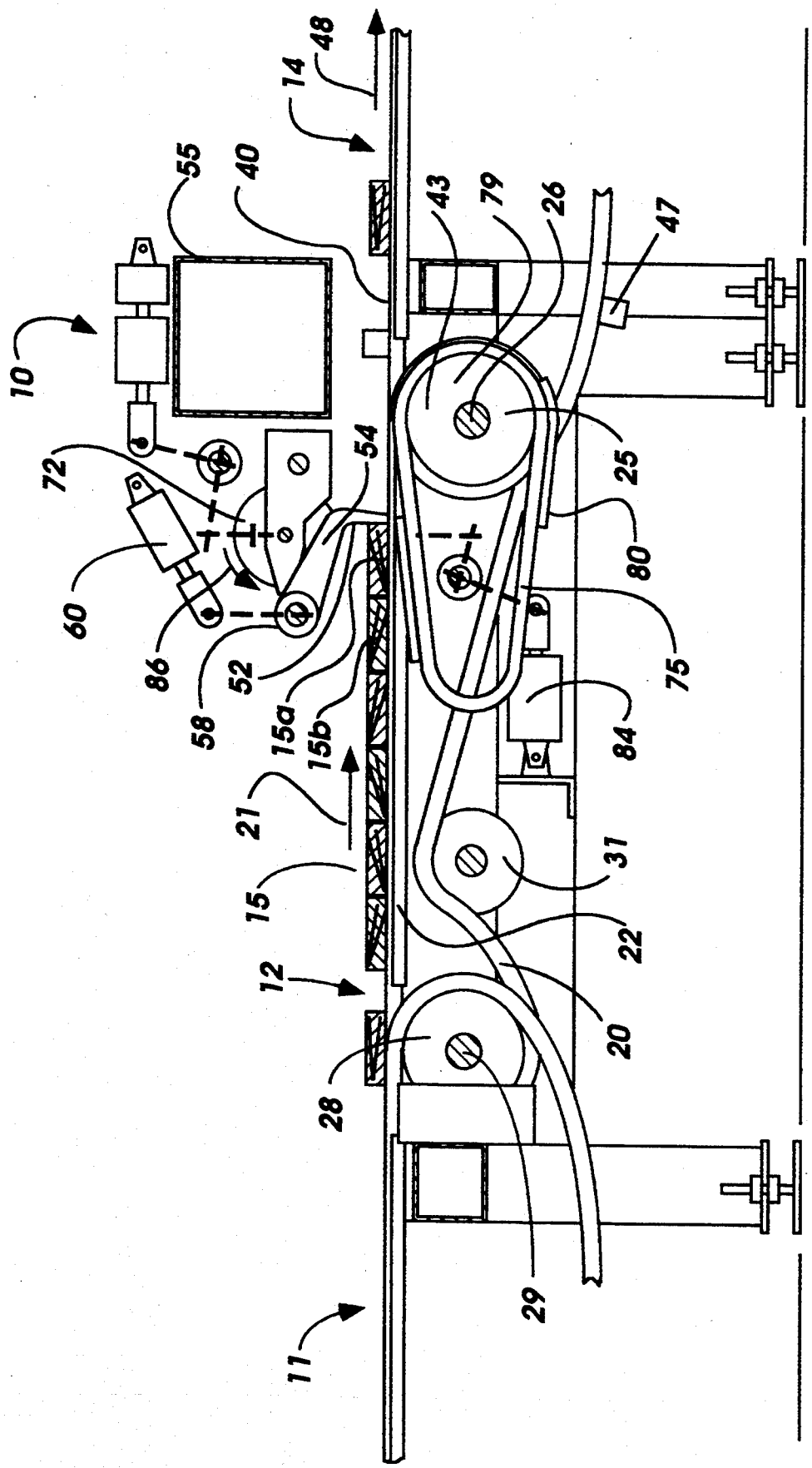

APPARATUS AND METHOD FOR LOADING LUMBER ONTO A HIGH-SPEED LUGGED TRANSFER DECK

FIELD OF THE INVENTION

This invention relates to a method and apparatus for transferring pieces of lumber one at a time from a smooth transfer deck onto a lugged transfer deck. The device has particular application in lumber mills.

BACKGROUND OF THE INVENTION

In a typical commodity lumber mill, boards are cut from a log and then transferred to a machine center for edging or other processing. The processed boards may then be transferred to other machine centers for further processing. Many machine centers are designed to accept boards at regular intervals, one at a time, from a lugged transfer deck. Lugged transfer decks are also used to singulate boards for sorting and grading.

In its simplest form, a lugged transfer deck comprises a series of parallel longitudinally oriented chains which all move at the same speed. Lugs project upwardly at spaced intervals along the chains. The lugs on the chains are aligned in transverse rows across the transfer deck. The boards lie transversely on top of the chains. As the chains move, the rows of lugs push the boards along the transfer deck.

The boards are singulated as they are loaded onto the lugged transfer deck. That is, only one board is placed transversely on the lugged transfer deck between adjacent rows of lugs. The lugged transfer deck is preferably fully loaded with one and only one board carried by every row of lugs. Singulating the boards enables functions such as scanning, positioning, sorting, turning etc., to be accomplished for each board individually. Keeping the lugged transfer deck fully loaded maximizes the number of boards which are processed by a machine center which is fed by the lugged transfer deck.

Boards are often produced at somewhat random times by the process preceding a lugged transfer deck. To ensure a steady supply of boards to the lugged transfer deck, boards are typically accumulated in a single layer on a smooth transfer deck just before the lugged transfer deck.

A smooth transfer deck comprises a number of smooth longitudinally oriented spaced apart chains which move together along the transfer deck. Boards are laid transversely on the chains. As the chains move the boards are carried along the smooth transfer deck. If the boards are prevented by an obstruction from moving along the transfer deck, the smooth chains continue to slide along under the boards until the obstruction is removed and the forward progress of the boards resumes.

The lugged transfer deck normally operates continuously and uniformly to suit the downstream process requirements, with every lug designed to receive a piece of lumber. Typical lugged deck speeds are approximately 60/80 lugs per minute, or 200 feet per minute. The smooth transfer deck generally moves more slowly than the lugged transfer deck, typically at approximately 100 feet per minute.

A lug loader is provided between the smooth transfer deck and the lugged transfer deck. The purpose of the lug loader is to take boards from a closely spaced accumulation of boards on the smooth transfer deck, and transfer them, one at a time, onto the lugged transfer deck. The lug loader must place exactly one board in front of each successive row of lugs on the lugged transfer deck.

Prior art lug loaders typically provide a stop at the end of the smooth transfer deck. Boards accumulate behind the stop. This ensures a consistent supply of lumber for loading by the lug loader. When a board is to be loaded it must be accelerated to a speed close to that of the chains on the lugged transfer deck. This is accomplished by an accelerating section. In prior art lug loaders the accelerating section typically comprises short chains and friction wheels, spaced apart and located across the smooth transfer deck, positioned parallel with and projecting slightly higher than the smooth transfer deck chain runners, and located just past the stop. The chains and wheels of the accelerating section are positioned to contact the underside of a board as it moves past the stop. The accelerating section is typically driven mechanically from the lugged transfer deck.

In such prior art lug loaders, the loading cycle begins when a board is located against the stop (as determined by an electronic switch of a known design), and the row of lugs to which the board is to be loaded has reached a predetermined location. The stop is then lowered to allow the leading board to pass the stop and enter the accelerating section. In the accelerating section, the friction between the bottom of the board and the moving chains and wheels of the accelerating section accelerates the board and propels the board onto the moving lug chain of the lugged transfer deck.

When the leading board is accelerated a gap is created between the leading board and the board immediately behind it on the smooth transfer deck. An electronic switch detects this gap. The stop is inserted into the gap to prevent the following board from moving onto the acceleration section. While the leading board is being accelerated, the smooth transfer deck carries the following board up to the stop where it is ready to be loaded when the next row of lugs moves into position. When the next row of lugs is in position the process is repeated.

Because prior art lug loaders generally rely upon friction on the bottom of a board to draw the boards into their acceleration sections and to accelerate boards in their acceleration sections, such lug loaders use a stop which projects upwardly from below the level of the smooth transfer deck. When the stop is in its raised position it slightly lifts the leading edge of the leading board so that it does not contact the moving parts of the acceleration section. This prevents the leading edges of the boards from being damaged by contact with the moving parts of the acceleration section while they are held back by the stop.

The stops in prior art lug loaders typically comprise a series of parallel pivoting arms having vertical stop surfaces. The pivoting arms are connected to an actuating mechanism. The vertical stop surfaces are normally located along each side of the smooth transfer deck chains and before the lugged deck tail sprockets. In its raised position the stop projects above the smooth transfer deck by an amount approximately equal to the thickness of one of the boards being loaded. The lugs passing around the lugged deck tail sprocket, have clearance to pass the stationary lumber positioned behind the stop.

The speed of the lug loader is often the limiting factor in determining how much lumber can be sent along a lugged transfer deck to a machine center or a sorting center. Machine center processing speeds have increased substantially in recent times. The speeds of the lugged transfer decks which carry boards to such machine centers have also increased. Today, speeds of approximately 110 to 130 lugs per minute are desired. These lug speeds are equal to chain speeds in the range of approximately 200 to 350 feet per minute.

At such high speeds, the accelerating section in prior art lug loaders is generally incapable of accelerating a board to the speed of the lugged transfer deck chains in the time interval between successive lugs. This is because in prior art lug loaders the forces used to accelerate the boards to be loaded are almost exclusively derived from friction between the lower surface of the boards to be loaded and moving chains and/or wheels in the acceleration section. The magnitude of such forces is limited by the coefficient of friction between the board and such moving frictional surfaces and the weight of the board.

If the force required to accelerate the board to the required speed is greater than the frictional force developed between the board and the frictional surfaces in the accelerating region then the board will slip excessively relative to the friction surfaces. This excessive slippage is especially severe on frozen lumber. The coefficient of friction between frozen lumber and a friction surface is typically much lower than the coefficient of friction between non-frozen lumber and the same frictional surface.

Another problem with prior art lug loaders is that, in some circumstances, boards can jump over the lower movable stops used in such lug loaders. As noted above, the stop mechanisms used in prior art lug loaders comprise a number of vertical stop surfaces which project upwardly from below the smooth transfer deck. Such stop mechanisms are open at the top. This geometry occasionally allows boards which do not sit flat on the smooth transfer deck to be pushed over the top of the stop. This can occur, for example for boards which are bowed or which have waney lower faces (i.e. faces which are not flat due to being cut from the outside of the log). When the friction force developed between the underside of the board and the smooth chain moving against it, forces a non-vertical face of a board against the vertical surface of the stop the face of the board can be forced to ride up the face of the stop and then over the stop. When this occurs, the operation of loading lumber into lugs is interrupted, and lost production ensues.

A third problem with standard prior art lug loaders is that the ratio of the speed of the smooth transfer deck to that of the lugged transfer deck is generally either fixed or time consuming to change. The relative speeds chosen are a compromise to accommodate the widest boards which will be loaded. Each time a board is loaded, the boards behind it on the smooth transfer deck must be moved ahead by the width of the board before the next lug on the lugged transfer deck is in position to be loaded. Therefore, the smooth transfer deck should operate faster when wider boards are being loaded than when narrower boards are being loaded.

When there is a mixture of batches of wide and narrow boards on the smooth transfer deck, the narrower pieces spend more time against the stop than they would if the system were optimized for narrow boards. Therefore, narrow boards experience more chain slippage than necessary on their bottom surfaces while they are held back by the stop waiting to be loaded. Excessive sliding of the smooth transfer deck chains beneath the boards, can mark the boards unnecessarily.

SUMMARY OF THE INVENTION

This invention provides apparatus for loading boards from a first position on an input deck means onto a lugged transfer deck. The apparatus comprises an accelerating section means extending below the first position for carrying boards from the first position to the lugged transfer deck. The accelerating section means comprises a movable first board-contacting surface for carrying boards from the first position to the lugged transfer deck. The accelerating section means is movable between a disengaged position wherein the first board-contacting surface does not contact a board at the first position and an engaged position wherein the first board-contacting surface contacts a lower surface of a board at the first position. The apparatus further comprises drive means for moving a first board-contacting surface of the accelerating deck means at a first velocity in a first direction from the first position toward the lugged transfer deck; actuator means associated with the accelerating section means for moving the accelerating section means between its engaged and disengaged positions; and, board pressing means above the accelerating section means for clamping a board between a second board-contacting surface on the board clamping means and the first board-contacting surface when the accelerating section means is in the engaged position, The second board-contacting surface on the board pressing means is movable in the first direction at the first velocity, The invention further provides apparatus for loading boards onto a lugged transfer deck, The lugged transfer deck comprises transverse rows of lugs and drive means for driving the rows of lugs along the lugged transfer deck at a rate such that the interval between successive sets of lugs passing a point on the lugged transfer deck is T seconds, The apparatus comprises: input deck means for delivering boards to a first position; stop means for retaining a board at the first position; stop actuator means for moving the stop means to a disengaged position to permit passage of a board past the stop means in a first direction; and lower accelerating section means for carrying boards in the first direction from the first position to the lugged transfer deck, The lower accelerating section means extends below the first position and comprises a plurality of endless loops oriented parallel to the first direction, The loops comprise at least one elevated section comprising a first board-contacting surface, The apparatus further comprises drive means for moving the loops to carry the elevated sections in the first direction from the first position at a first velocity such that one of the elevated sections passes the first position every T seconds, The invention further provides a lumber handling system comprising: a smooth transfer deck; a lugged transfer deck comprising a plurality of transverse rows of lugs and drive means for moving said rows of lugs along said lugged transfer deck; and a lug loader between the smooth and lugged transfer decks. The lug loader comprising an accelerating deck extending from the smooth transfer deck to the lugged transfer deck; a driven press roller spaced above the accelerating deck; a gap between the press roller and said accelerating deck and actuator means for reducing the gap to clamp a board between the press roller and the accelerating deck.

Another aspect of the invention provides a method for loading a board from a first position onto a lugged transfer deck. The method comprises the steps of: providing a board at a first position; providing an accelerating deck comprising a first board-contacting surface, the first board clamping surface moving in a first direction on a first side of the first position and providing a board clamping member comprising a second board-contacting surface on a second side of the first position; detecting when a lug of the lugged transfer deck is in a predetermined position; raising the accelerating deck to grip the board between the first and second board-contacting surfaces; accelerating the board while it is between the first and second board-contacting surfaces; and, carrying the board to the lugged transfer deck on the first board-contacting surface.

BRIEF DESCRIPTION OF THE DRAWINGS

In drawings which illustrate embodiments of the invention:

FIGS. 1A through 1F are schematic elevations of a lug loader showing the steps in the loading of a single board according to the invention;

DETAILED DESCRIPTION OF THE PREFERRED EMBODIMENT

Figure 1B:
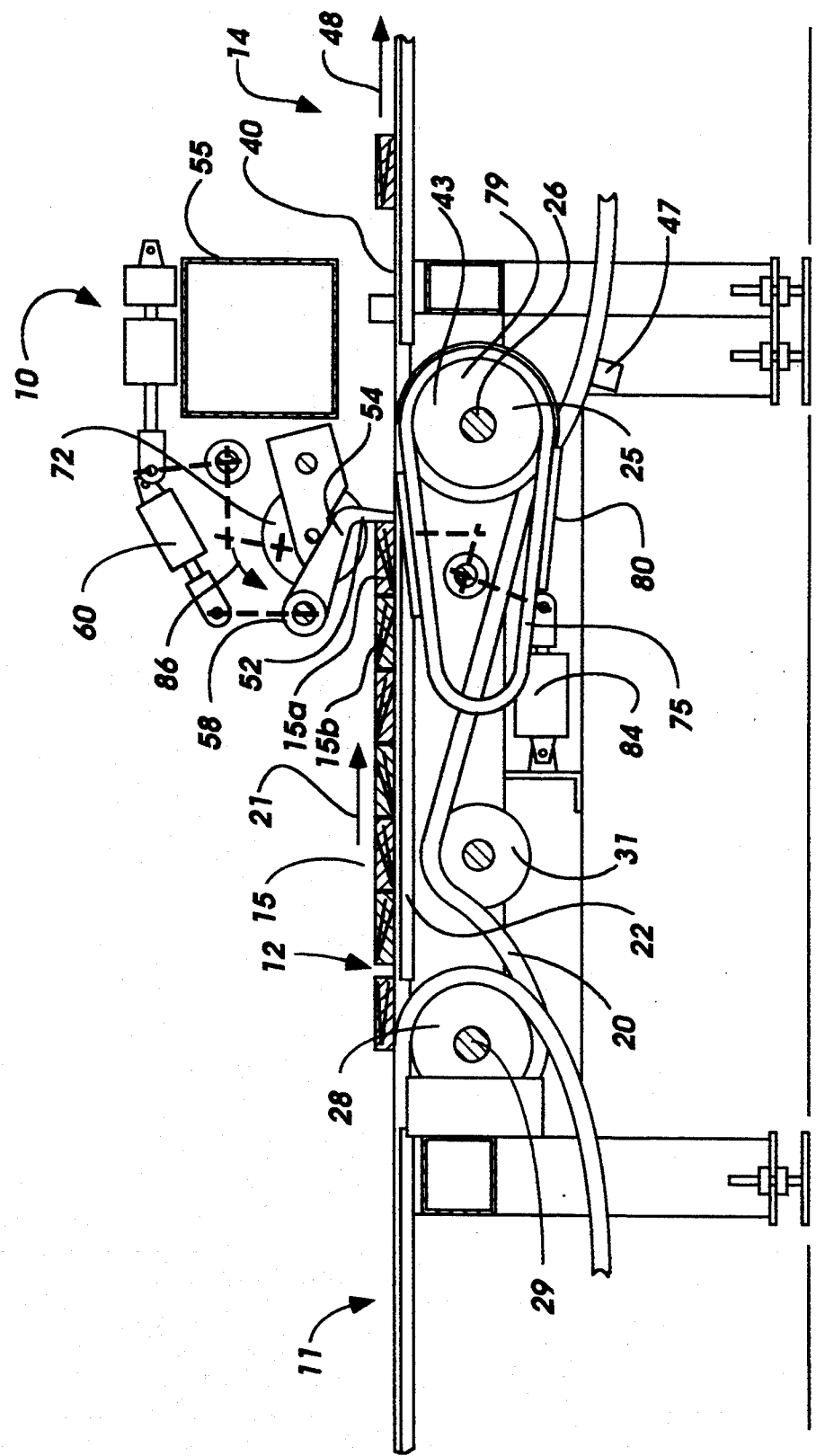

FIGS. 1A through 1F show a lug loader 10 according to the invention. Lug loader 10 is optimized for use in a planer mill and is designed not to cause undue marking of the boards being loaded. As shown in FIGS. 1A through 1F, a lug loader 10 is positioned between a smooth transfer deck 12 and a lugged transfer deck 14. Lumber handling equipment 11 of a known type ahead of smooth variable speed transfer deck 12, delivers a somewhat random supply of boards 15 in a single layer onto smooth transfer deck 12. Lug loader 10 transfers boards 15 from smooth transfer deck 12 which is upstream from lug loader 10 to lugged transfer deck 14 which is downstream from lug loader 10.

Smooth transfer deck 12 is preferably a variable speed transfer deck. Smooth transfer deck 12 comprises a number of parallel chain loops 20. Chains 20 run in longitudinal runners 22 and pass around head sprockets 25 on shaft 26 and tail sprockets 28 on shaft 29. Chains 20 are driven in the direction of arrow 21 by, for example, a drape drive arrangement comprising variable speed drape sprockets 31.

Lugged transfer deck 14 comprises a number of parallel chains 40. Chains 40 pass around tail sprockets 43 which are typically mounted on a single tail end shaft. Typically the tail end shaft of lugged transfer deck 14 is also the head end shaft 26 of smooth transfer deck 12. Chains 40 have equally spaced projecting lugs 47. Chains 40 are aligned with each other so that lugs 47 form transverse rows on lugged transfer deck 14. Chains 40 are driven in the direction of arrow 48 by a drive means (not shown) of known design.

Figure 1C:
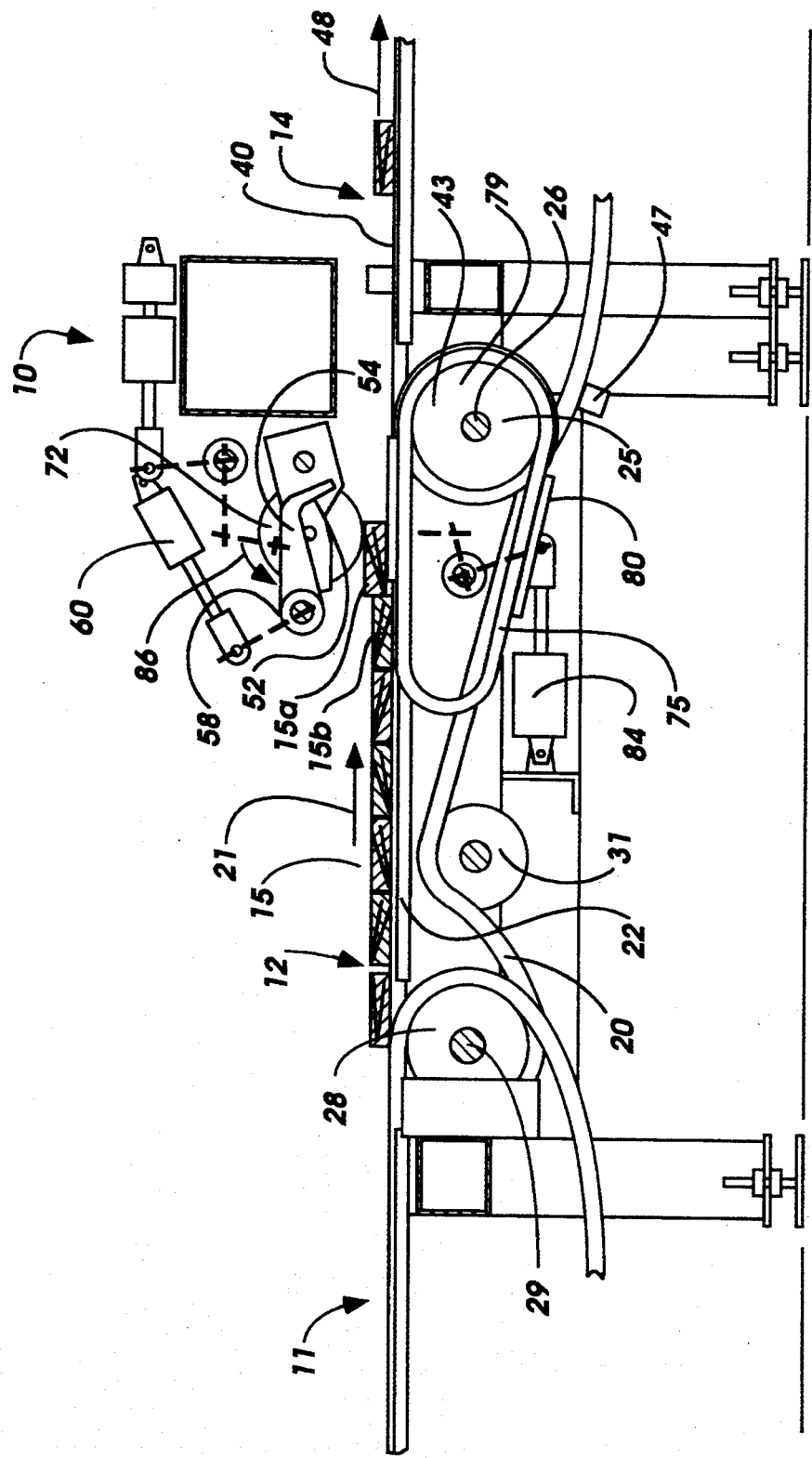
Figure 1D:
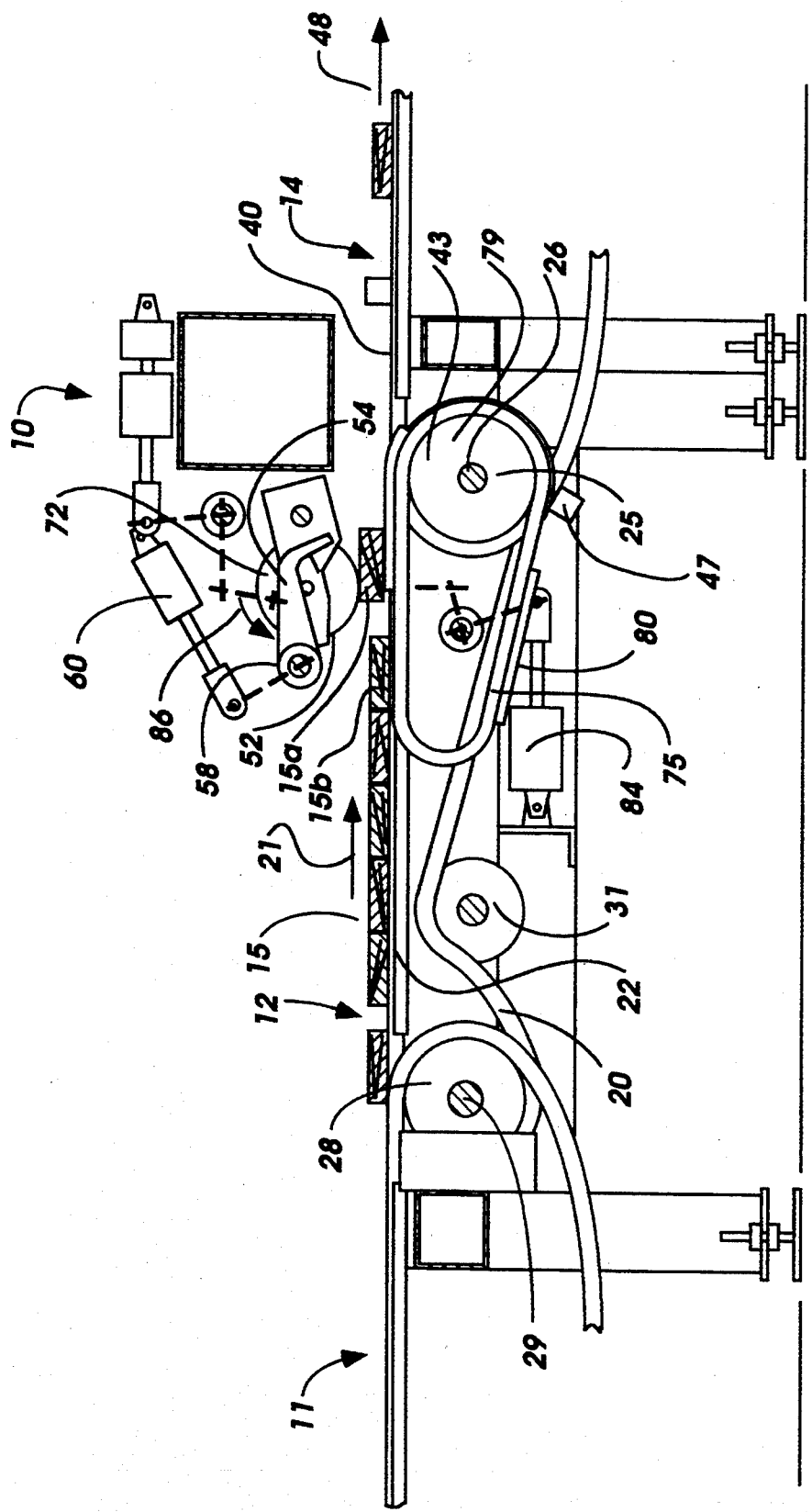

Boards 15 accumulate on smooth transfer deck 12 behind stop 50 on lug loader 10. Stop 50 is preferably an overhead stop comprising a number of parallel spaced apart arms 54 having transversely aligned vertical stop surfaces 52 each mounted at one end of an arm 54. A second end of each arm 54 is pivotally mounted to the frame 55 of lug loader 10. Stop 50 has two positions, a lowered position as shown in FIGS. 1A, 1B, 1E and 1F and a raised position as shown in FIGS. 1C and 1D. When stop 50 is in its lowered position then stop surfaces 52 block the passage of boards 15 along smooth transfer deck 12. Preferably stop 50 comprises a stop surface 52 along each side of each of smooth transfer deck chains 20. When stop 50 is in its raised position the passage of boards 15 past stop 50 is unimpeded.

When stop 50 is lowered then arms 54 prevent boards 15 from being pushed over the tops of stop surfaces 52 by chains 20. Stop 50 is associated with an actuator mechanism 58 which typically includes a pneumatic cylinder 60 and suitable linkages of known design for moving stop 50 between its raised and lowered positions.

Stop 50 is preferably located so that when it is lowered it is slightly upstream from lugged transfer deck tail sprockets 43 and so that there is some clearance between a board 15a which is against stop surfaces 52 and lugs 47 which are passing around lugged deck tail sprockets 43. Preferably the clearance between board 15a and lugs 47 is small to reduce the distance that lug loader 10 must carry board 15a to load it onto lugged transfer deck 14 from a position adjacent stop 50.

The speed of chains 20 on smooth transfer deck 12 is preferably proportional to the width of boards 15 and the speed of lugged transfer deck 14. For example, if lugged transfer deck 14 operates at a rate of 120 lugs-per-minute (LPM) and boards 15 are four inches wide, then smooth transfer deck 12 must operate at a speed of at least 40 feet per minute to fully load lugged transfer deck 14. Chains 20 are preferably operated at a speed just fast enough to advance a board 15 against stop 50 in the interval between the passage of successive lugs 47. This speed minimizes the time that boards 15 are held stationary by stop 50 while chains 20 continue to slide beneath boards 15 and thereby reduces the marking of boards 15 by chains 20.

Lug loader 10 carries boards 15 from stop 50 to lugged transfer deck 14 by means of accelerating deck 70 and press rollers 72. Accelerating deck 70 extends between board 15a behind stop 50 and lugged deck 14. Accelerating deck 70 preferably comprises a series of parallel chain loops 75 which move in the direction indicated by arrow 21. Chain loops 75 ride in runners 77. Chain loops 75 pass around and are driven by driven sprockets 79. Runners 77 are preferably radiused at their ends away from sprockets 79 so that chain loops 75 can travel smoothly onto runners 77. In the alternative, runners 77 may pass around tail sprockets (not shown). Sprockets 79 are preferably driven mechanically from lugged transfer deck 14 and operate synchronously with lugged transfer deck 14. Sprockets 79 are advantageously mounted on tail shaft 26 of lugged transfer deck 14.

Each of chain loops 75 comprises two or more outwardly projecting elevated sections 80. The outer surfaces 81 of elevated sections 80 preferably have a high coefficient of friction with respect to boards 15. Elevated sections 80 are spaced one lug apart around chain loops 75. That is, the spacing of the elevated sections is related to the speed of motion of chain loops 75 in such a way that sets of elevated sections 80 pass the stop at the same rate as sets of lugs 47 on lugged transfer deck 14 pass any point on the transfer deck.

If chain loops 75 are driven by a first sprocket on a shaft which is caused to rotate by a second sprocket driven by chains 40, then synchronization of the operation of chain loops 75 and chains 40 can be readily achieved. This may be done by providing the first sprocket with the same number of teeth as there are links in chain loops 75 between the leading edges of successive elevated sections 80 and providing the second sprocket with the same number of teeth as there are in chains 40 between successive lugs 47. Preferably the first and second sprockets are approximately equal in diameter. If this is the case then chains 40 on lugged transfer deck 14 and chain loops 75 on accelerating deck 70 will move at approximately the same speed and the distance between successive elevated sections 80 will be approximately the same as the distance between rows of successive lugs 47 on transfer deck 14. It can be readily appreciated that, with this arrangement, if a row of elevated sections 80 is properly positioned with respect to one set of lugs 47 that after the shaft carrying the first and second sprockets rotates through one full revolution the next row of elevated sections 80 will be properly positioned with respect to the next set of lugs 47.

Outer surfaces 81 are preferably long enough to support the widest piece of lumber to be loaded. Most commodity lumber mills do not cut boards more than 12 inches wide.

Accelerating deck 70 may be moved between retracted and engaged positions by an actuator 84 which is, for example, a pneumatic cylinder. Actuator 84 moves accelerating deck 70 by means of a linkage which comprises link 85a, equalizer shaft 85b and links 85c. When accelerating deck 70 is in its retracted position, elevated sections 80 do not contact a board 15a which is against stop 50. When accelerating deck 70 is in its engaged position, outer surfaces 81 of elevated sections 80 pass above the top surfaces of chains 20 on smooth deck 12 but the outer surfaces of chain loops 75 pass below the top surfaces of chains 20 on smooth deck 12.

Press rollers 72 are located above leading stationary board 15a which is just behind stop 50. Press rollers 72 are preferably aligned with chain loops 75 on accelerating deck 70. Press rollers 72 are cylindrical drums which are driven by a drive means (not shown) to rotate in the direction of arrow 86. The speed of rotation of press rollers 72 is preferably such that the linear speed of points on the outer surfaces 88 of press rollers 72 is the same as the linear speed of chain loops 75. Surfaces 88 of press rollers 72 may be covered with rubber or a similar material to avoid marring boards 15 as they are loaded.

Press rollers 72 are mounted in a frame 90 which is pivotally mounted to frame 55 of lug loader 10. Frame 90 is connected by a linkage 92 to an actuator means which is, for example, pneumatic cylinder 94. Actuator means 94 is preferably capable of positioning frame 90 and press rollers 72 in one of three discrete positions. When press rollers 72 are in their uppermost position there is a large gap between press rollers 72 and smooth transfer deck 12. This allows boards 15 to advance along smooth transfer deck 12, below press rollers 72 without touching surfaces 88 of press rollers 72 even if boards 15 are somewhat warped. When press rollers 72 are in their intermediate position they just clear the upper surface of a board 15a behind stop 50. Finally, when press rollers 72 approach their lowermost position they contact the upper surface of board 15a.

Figure 13:
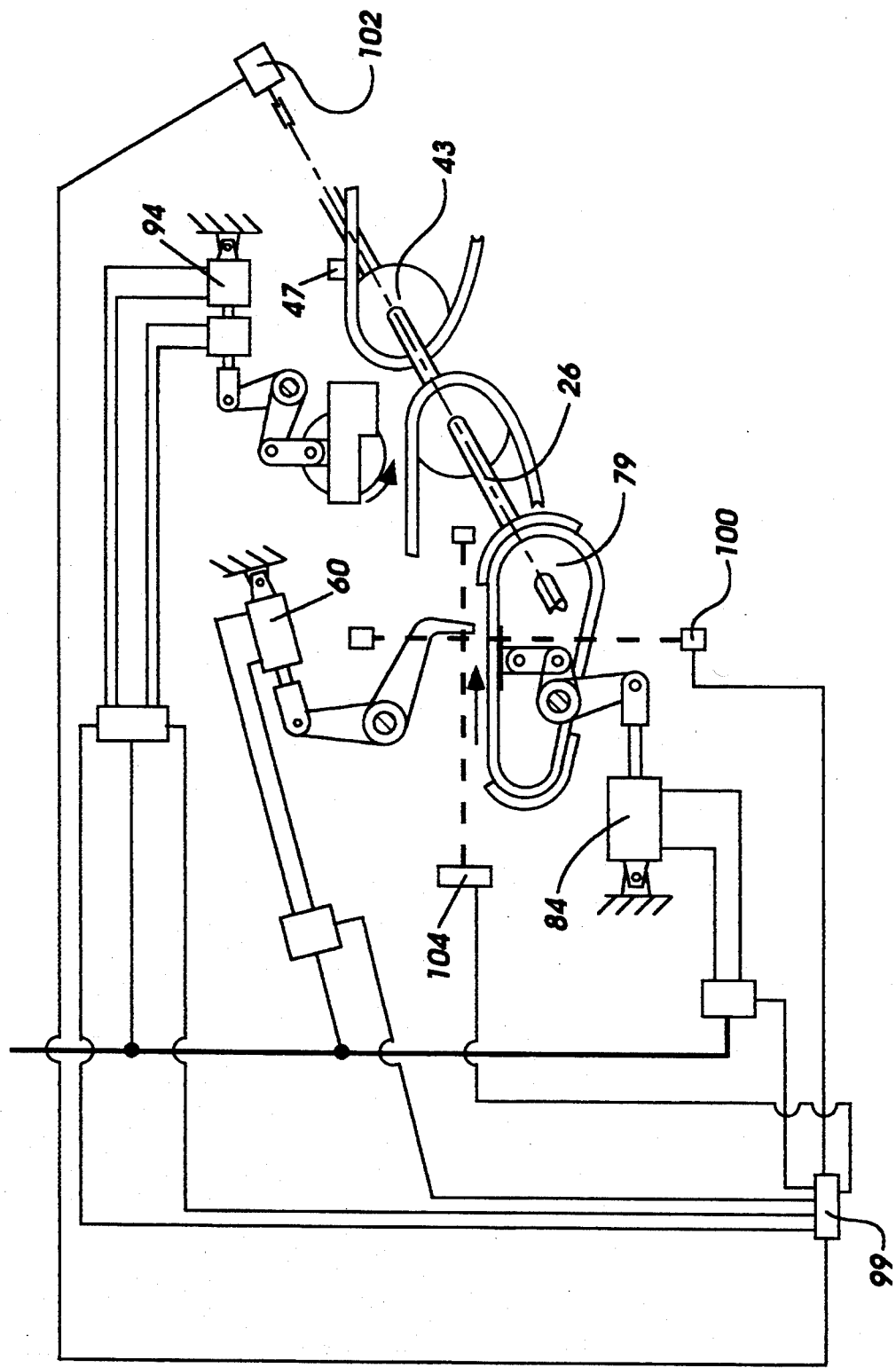
FIG. 13 is a schematic diagram of the control circuits used to operate the lug loaders of FIGS. 10 to 12.

As shown in FIG. 13, the operation of lug loader 10 is controlled by a control unit 99 which is preferably a programmable controller of known design. The control unit accepts input from a number of sensors. Board sensor 100 detects the presence of a board 15a against stop 50. Lug sensor 102 detects the position of lugs 47. Optional thickness sensor 104 measures the thickness of board 15a. Thickness sensor 104 is not generally required in the embodiments of the invention depicted in FIGS. 1 through 9 because these embodiments of the invention would be most typically used in a planer mill where all of the boards are very nearly uniform in thickness. Control unit 99, regulates and coordinates the operation of stop actuator cylinder 60, accelerating deck actuator cylinder 84 and press roll actuator cylinder 94.

OPERATION

The operation of lug loader 10 will now be described with reference to FIGS. 1A through 1F. As shown in FIG. 1A, at the start of a loading cycle, stop 50 is in its lowered position and a number of boards 15 are stationary on smooth transfer deck 12 immediately behind stop 50. Chains 20 on smooth transfer deck 12 are sliding beneath boards 15. Accelerating deck 70 is in its retracted position and press rollers 72 are in their uppermost position. The loading cycle begins when board sensor 100 indicates the presence of board 15a behind stop 50.

As shown in FIG. 1B, the first step in the lug loading cycle is to lower press rollers 72 to their intermediate position. This locates moving surfaces 88 of press rollers 72 just above the upper face of board 15a. This step reduces the distance that press rollers 72 will ultimately need to travel to contact board 15a. Consequently, it reduces the impact of press rollers 72 on board 15a.

When lug sensor 102 detects that a row of lugs 47 on lugged transfer deck 14 is in the correct position the control unit activates cylinder 60 to raise stop 50. As stop 50 is raised, press rollers 72 are lowered to their lowermost position and accelerating deck 70 is raised to its engaged position. At this point, as shown in FIG. 1C, the outer surfaces 88 of press rollers 72 are in contact with the top face of leading board 15a, and outer surface 81 of elevated section 80 is in contact with the lower surface of leading board 15a and is supporting board 15a clear of smooth transfer deck chains 20. Board 15a is clamped firmly between press rollers 72 and elevated sections 80 and can therefore be accelerated very quickly to the speed of elevated sections 80 without substantial slippage. In addition to assisting in the acceleration of boards, press rollers 72 also serve to flatten boards which are bowed.

Accelerating deck 70 is not raised to its engaged position until the trailing edge of elevated section 80 is beneath leading board 15a. In this way, board 15a is taken without touching or otherwise disturbing board 15b.

Figure 1E:
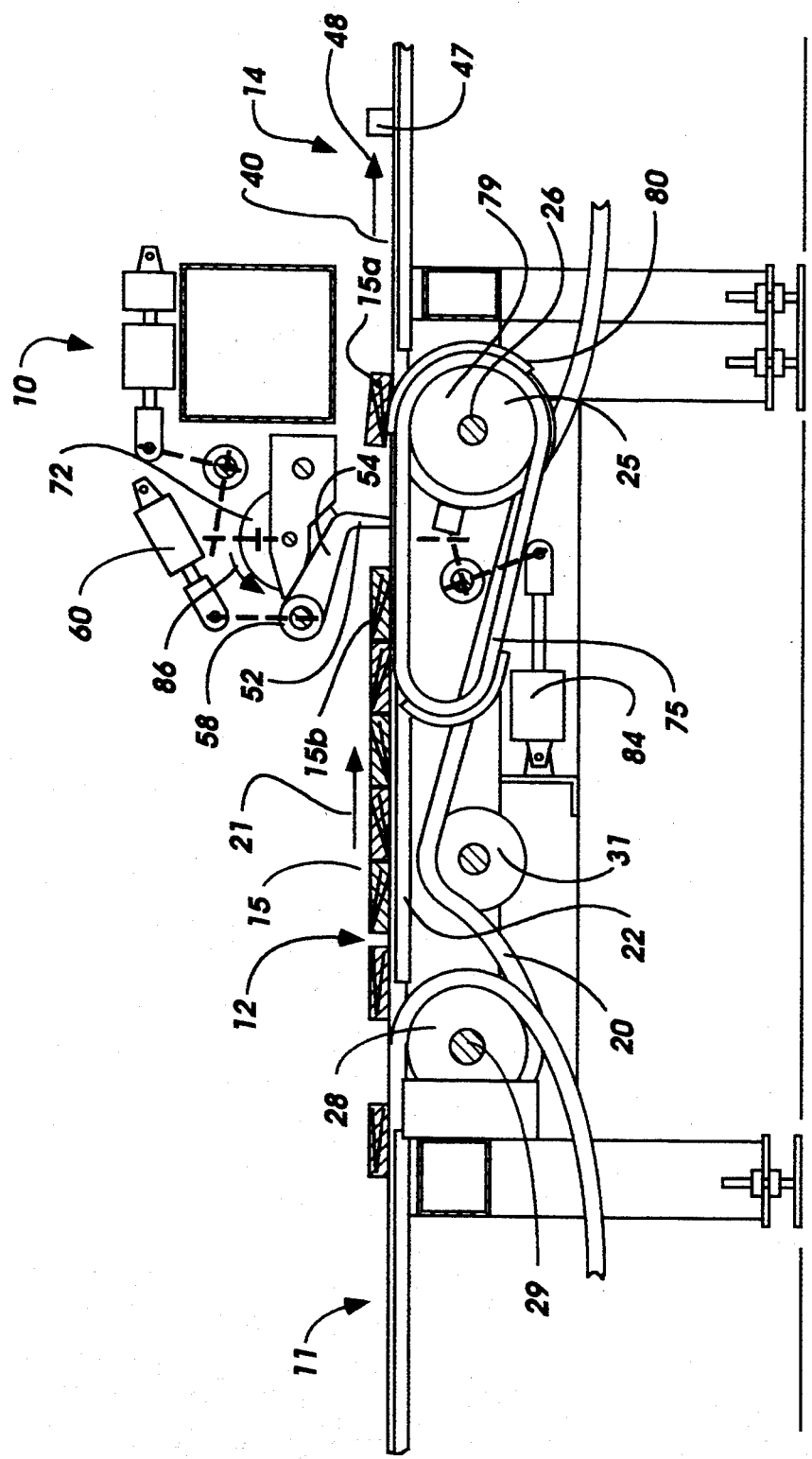

As shown in FIG. 1D, when the trailing edge of board 15a has been carried past press rollers 72, board 15a is moving at the same speed as elevated sections 80 and no longer needs press roller 72 to hold it in place on top of elevated sections 80. Because elevated sections 80 travel much more quickly than chains 20 on smooth deck 12, board 15a is pulled away from the board 15b which is immediately behind it to leave a gap. Board sensor 100 detects the gap and lowers stop 50 into the gap as shown in FIG. 1E. At the same time, press rollers 72 are lifted into their uppermost position.

Figure 1F:
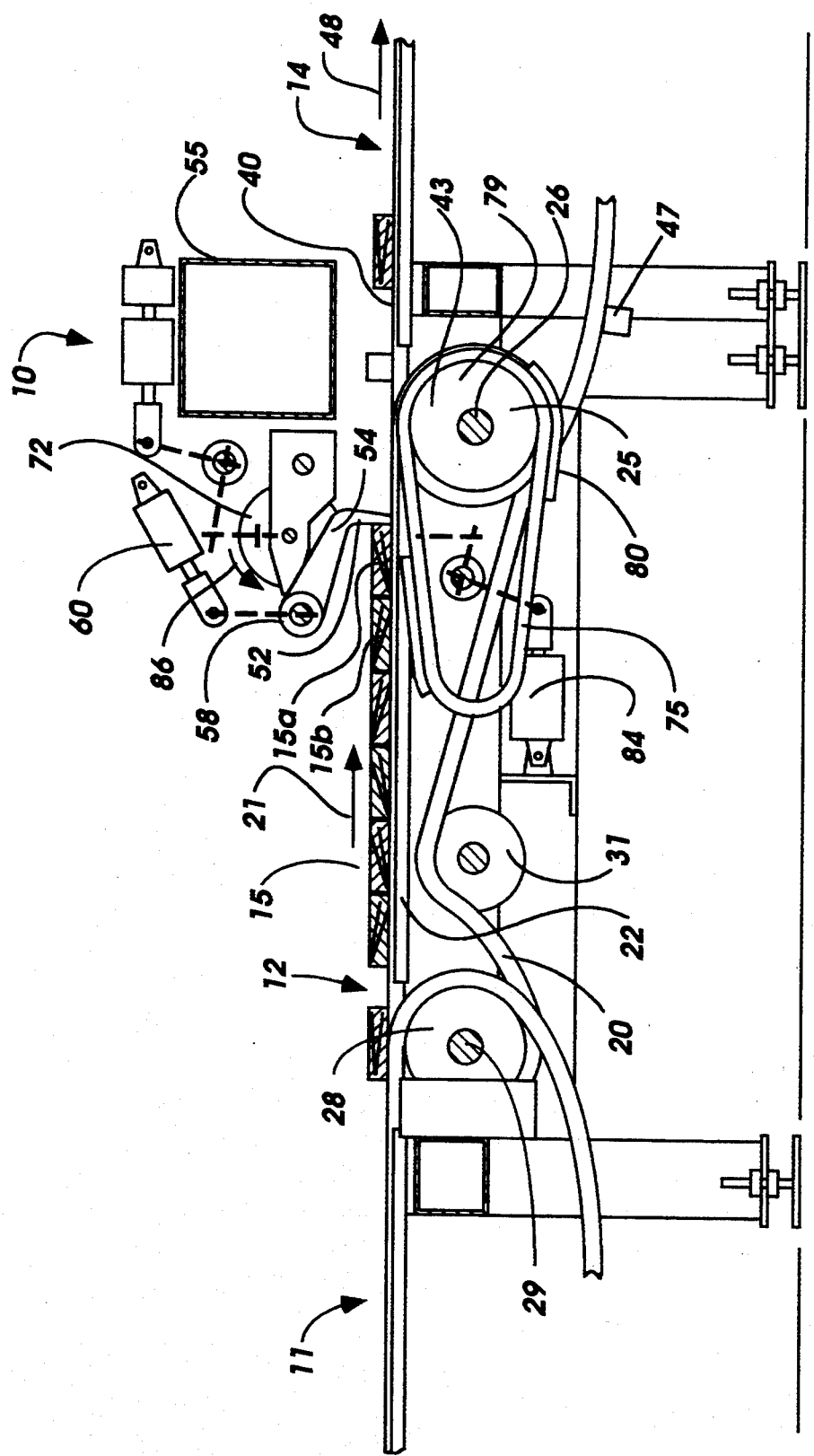
Figure 2:
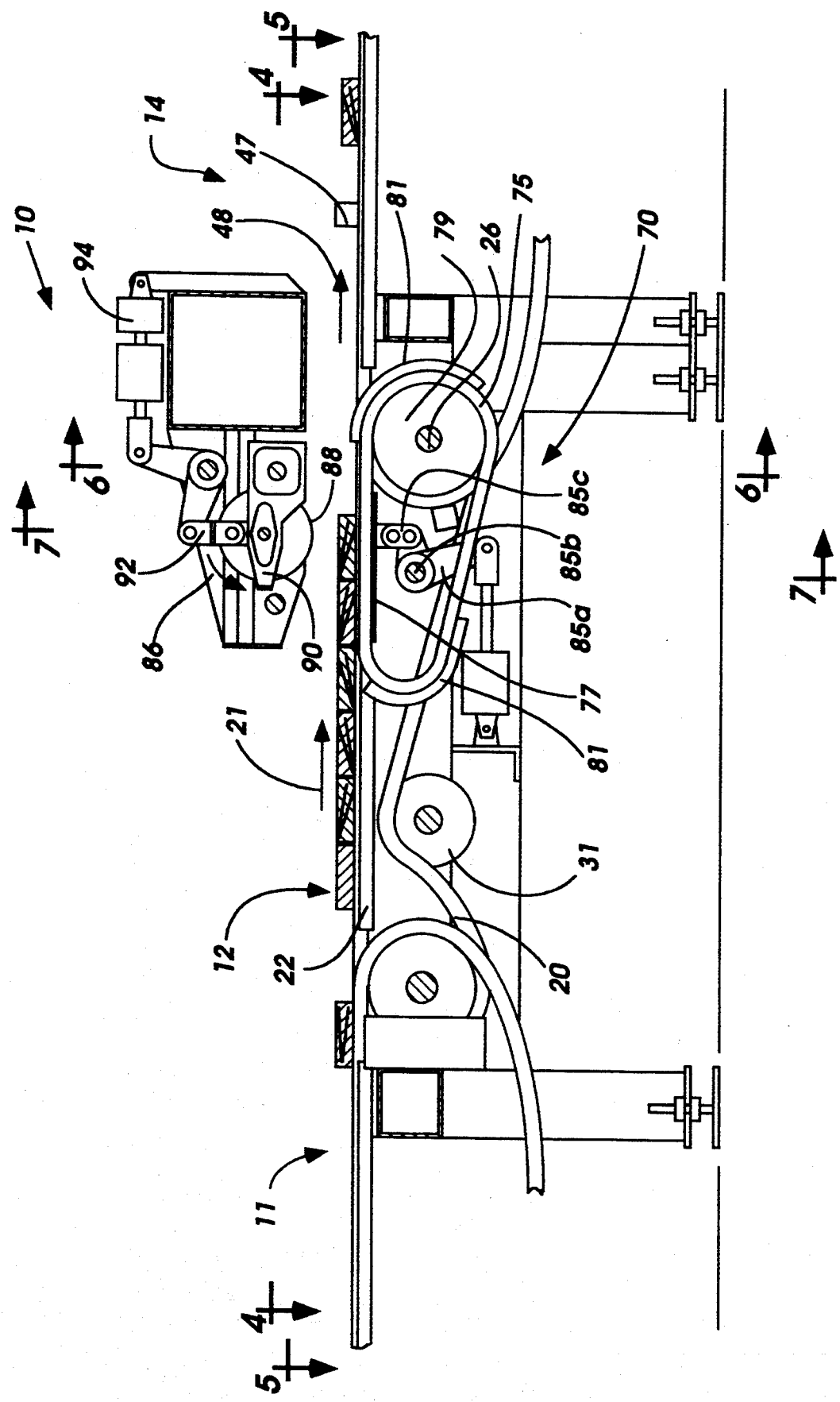
FIG. 2 is a vertical longitudinal section through a lug loader according to the invention showing the upper and lower clamping surfaces.
Figure 3:
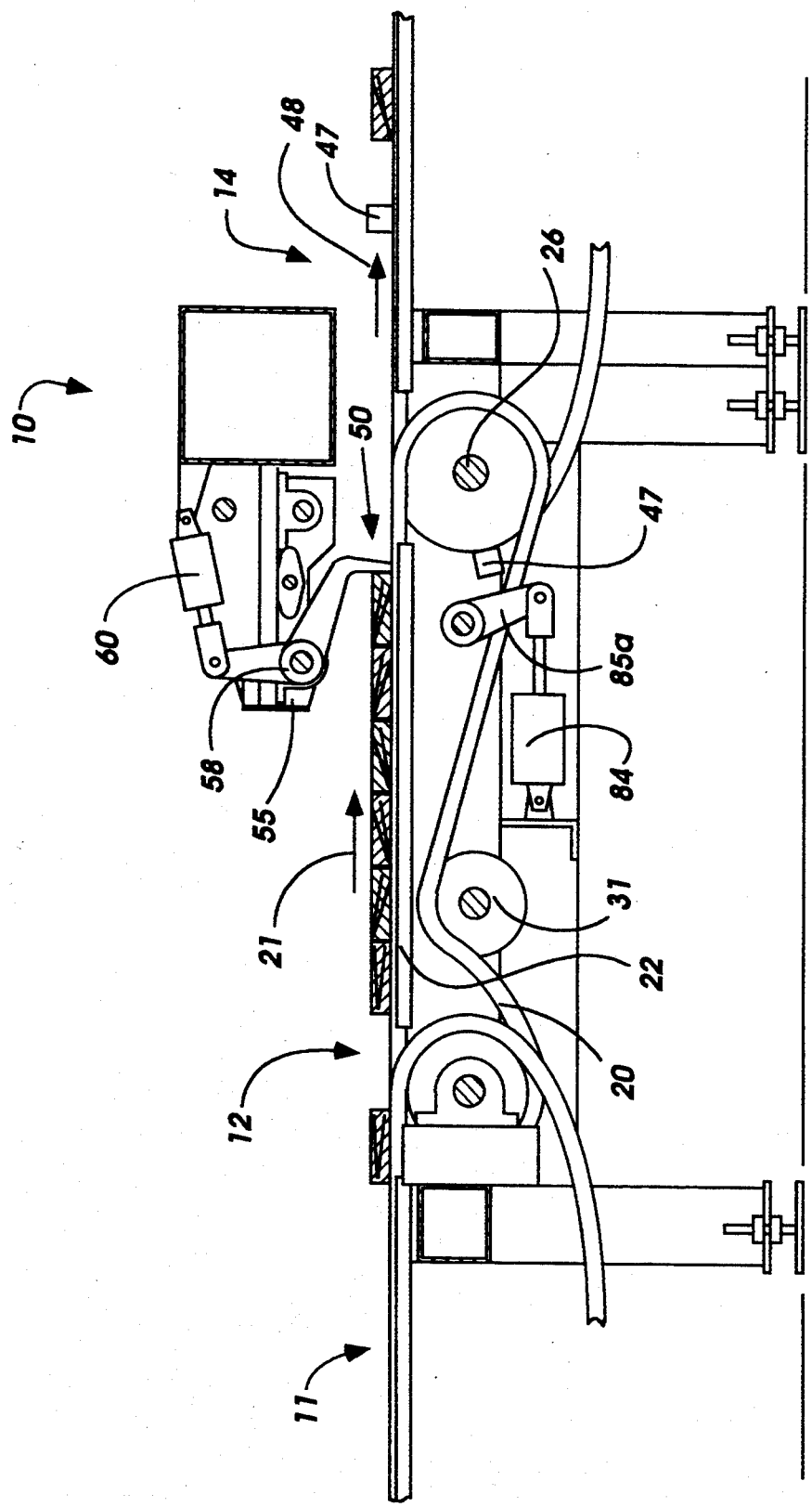
FIG. 3 is a vertical longitudinal section through the lug loader of FIG. 2 showing the stop mechanism.
Figure 4:
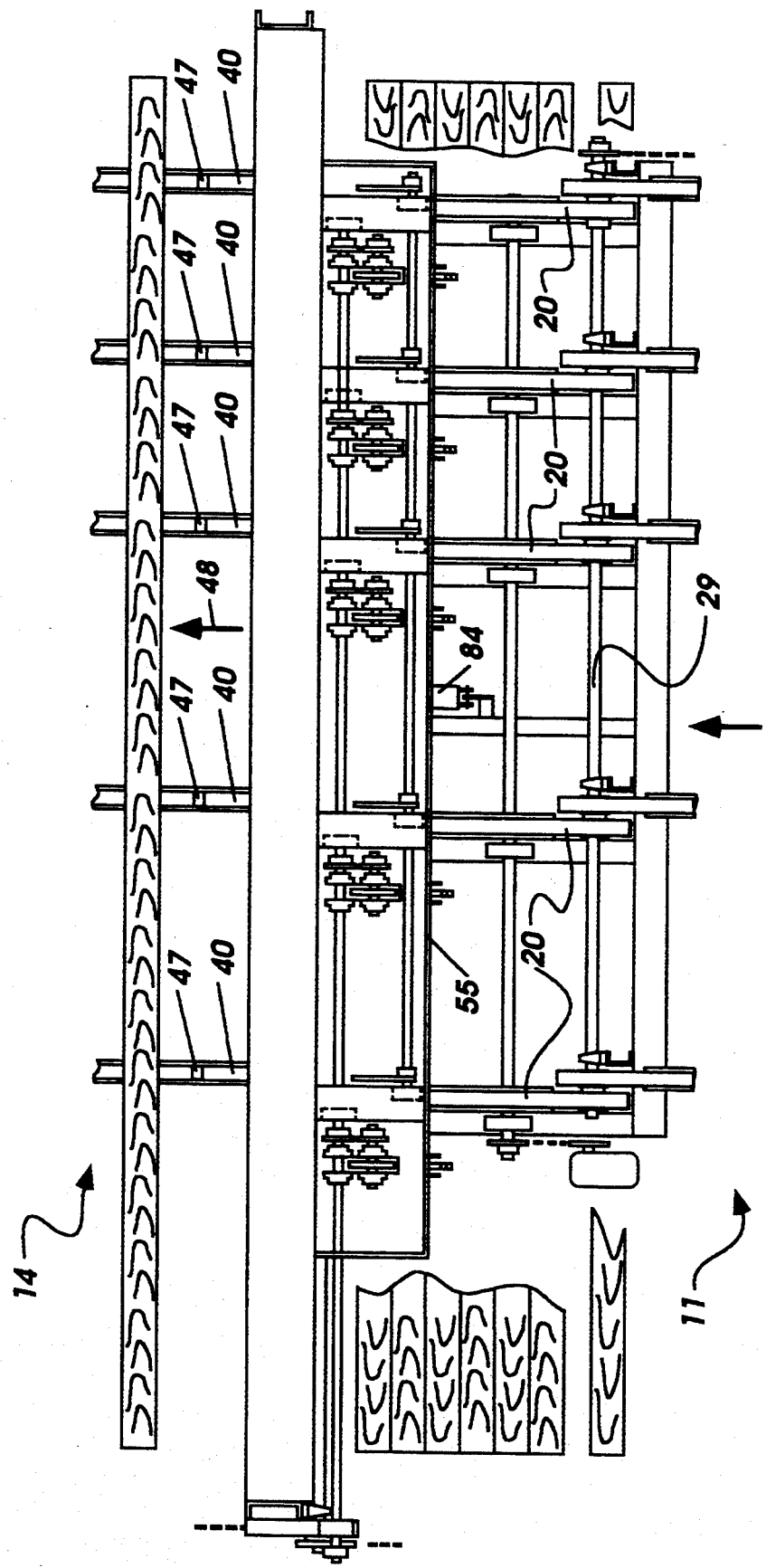
FIG. 4 is a plan view in the plane 4—4 of the lug loader of FIG. 2 showing the mechanism for operating the upper clamping mechanism.
Figure 5:
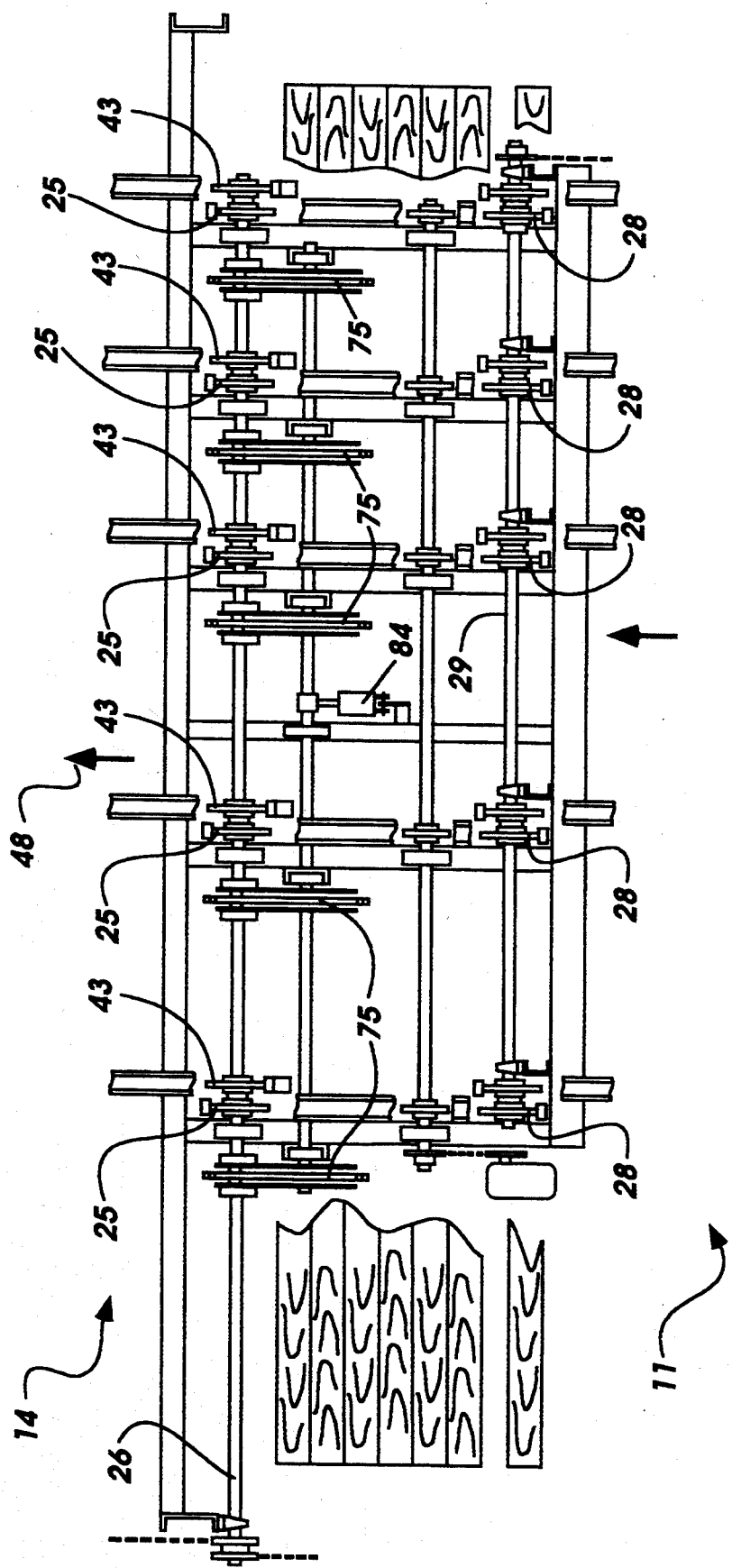
FIG. 5 is a partially cut away plan view in the plane 5—5 of the lug loader of FIG. 2 showing the mechanism for operating the lower clamping mechanism.
Figure 6:
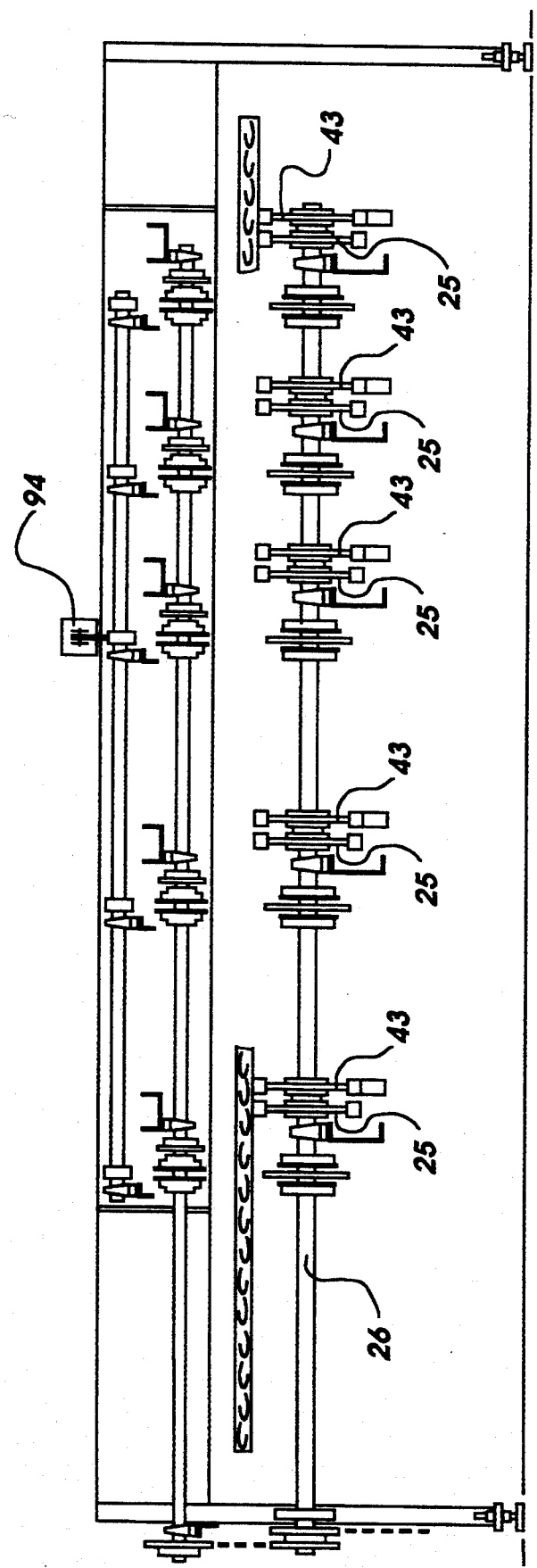
FIG. 6 is a transverse section in the plane 6—6 of the lug loader of FIG. 2.
Figure 7:
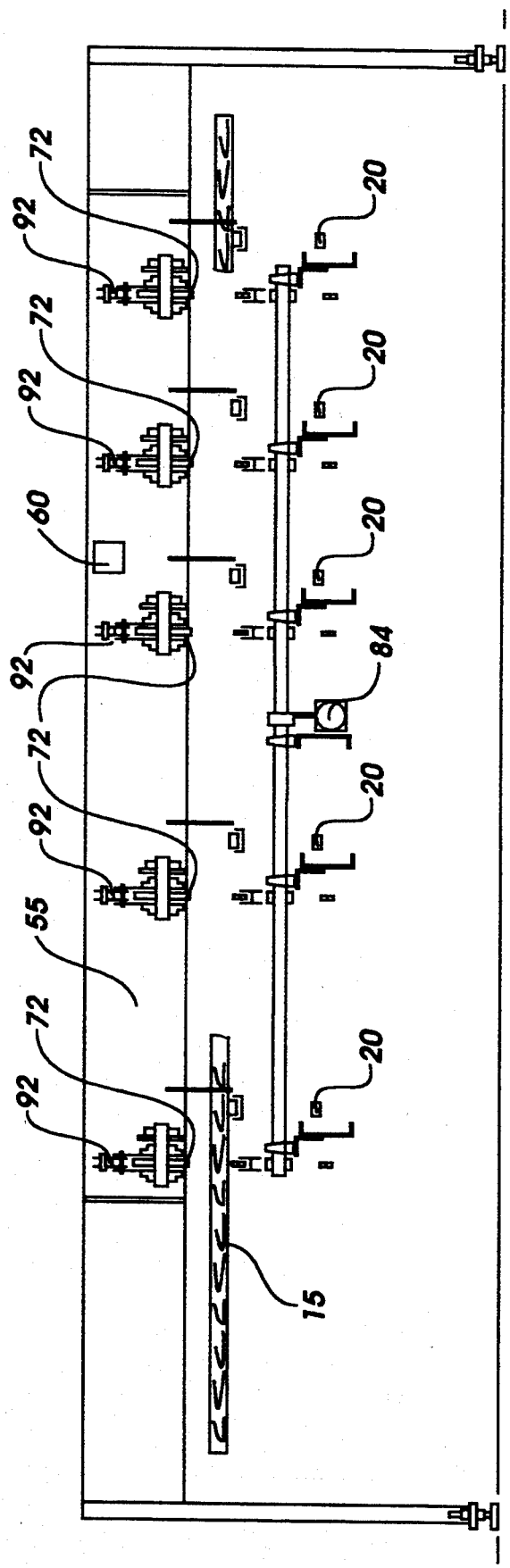
FIG. 7 is a transverse section in the plane 7—7 of the lug loader of FIG. 2.

As shown in FIG. 1F, the cycle is completed as elevated sections 80 deposit board 15a on lugged transfer deck 14 ahead of a row of lugs 47. Accelerating deck 70 is then retracted before elevated sections 80 hit the bottom surface of board 15b which has been carried to stop 50 by smooth transfer deck chains 20.

The loading cycle is repeated each time a row of lugs 47 passes lug loader 10 provided that a board 15 is against stop 50 and is detected by board detector 100.

Many variations in the structure and operation of the lug loader of the invention are possible without departing from the scope and spirit of the invention. Different configurations of lug loader are preferred depending upon whether the boards to be loaded are of uniform thicknesses or of varying thicknesses and whether the boards to be loaded are of uniform widths or of varying widths.

Figure 8:
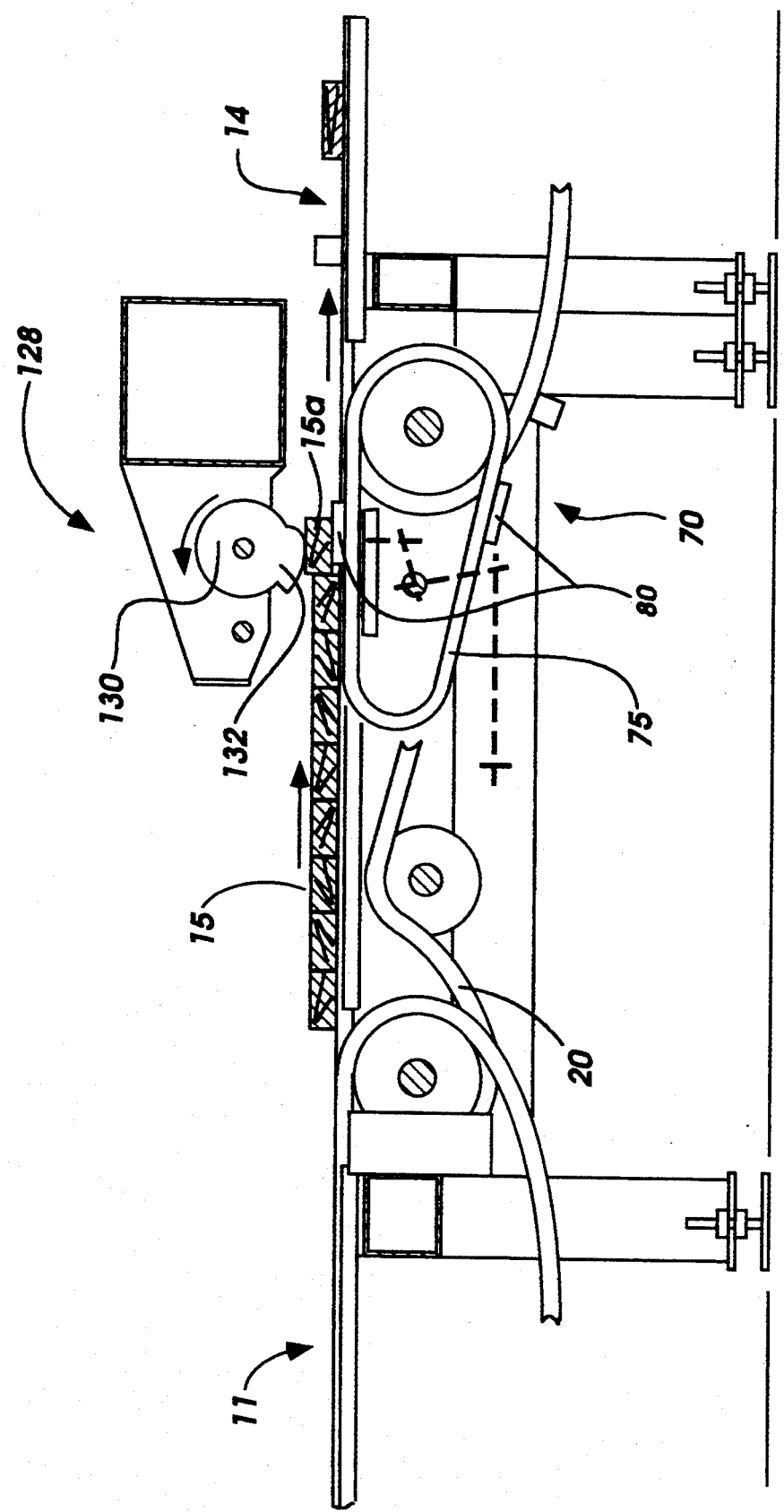
FIG. 8 is a schematic view of a first alternative embodiment of the lug loader of the invention.

FIG. 8 shows an alternative embodiment of the invention adapted for use in a situation where the boards being loaded are uniform in both width and thickness. In the embodiment shown in FIG. 8, lug loader 128 has press rollers 130 which do not move vertically but have one or more projecting lobes 132. The rotation of press rollers 130 is synchronized with the motion of lugged transfer deck 14 and accelerating deck 70 so that when a loading cycle starts one set of lobes 132 project downwardly toward the top surface of board 15a. At the same time, one set of elevated sections 80 is under board 15a. The diameter and rate of rotation of press rollers 130 are set so that the surfaces of lobes 132 which contact the top surface of board 15a are moving toward lugged transfer deck 14 at the same speed as elevated sections 80. Accelerating deck 70 operates in the manner described above. When the loading cycle is initiated, stop 50 is raised, accelerating deck 70 is raised to its engaged position and board 15a is thereby clamped between elevated section 80 on chain 75 and lobe 132.

In the configuration shown in FIG. 8, the length of elevated sections 80 on accelerating deck 70 are approximately equal to the width of boards 15 for which the lug loader is designed.

Figure 9:
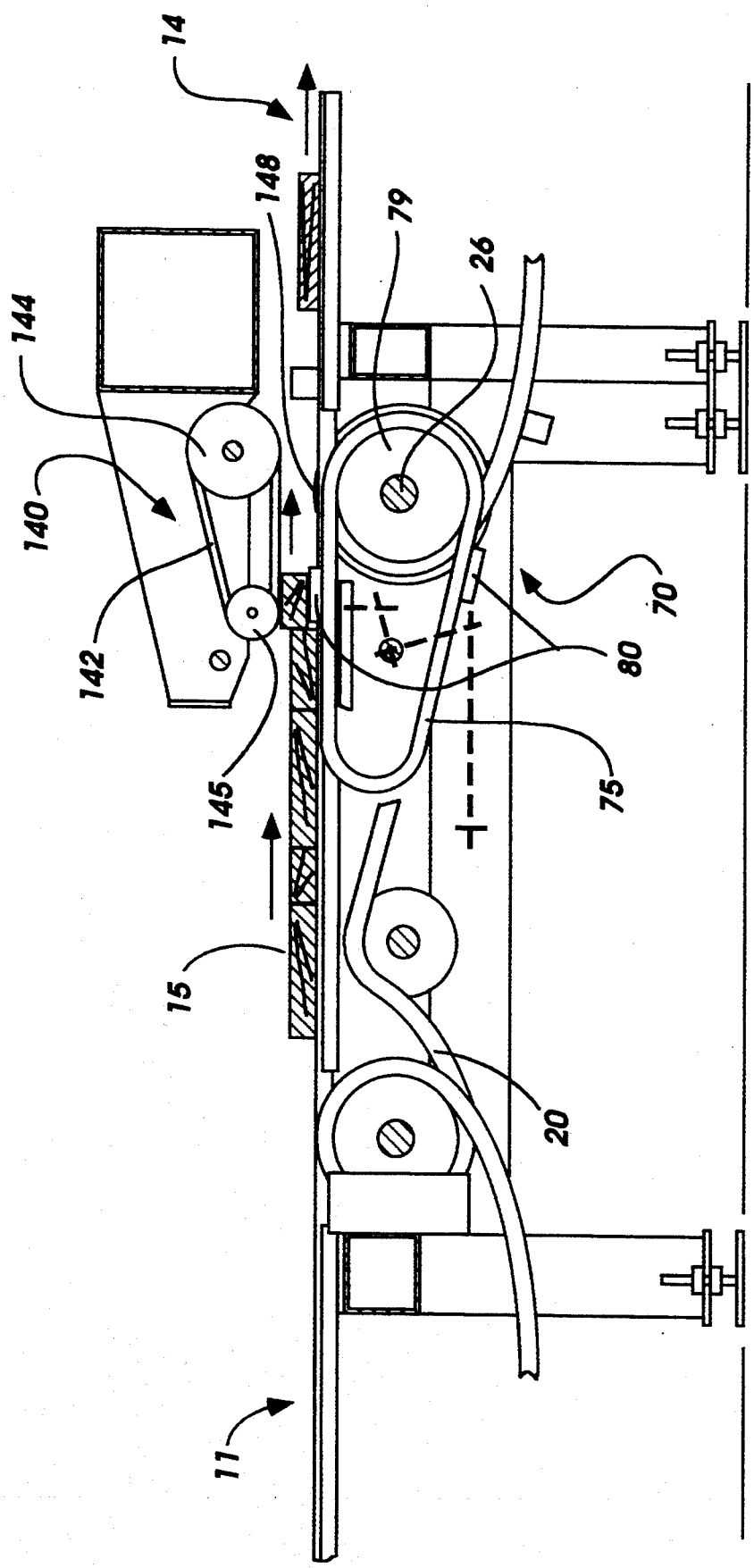
FIG. 9 is a schematic view of a second alternative embodiment of the lug loader of the invention.

FIG. 9 shows a second alternative embodiment of the invention adapted to handle boards of uniform thickness but various widths. In the embodiment of FIG. 9, press rollers 72 have been replaced with an overhead clamping deck 140. Clamping deck 140 comprises a number of parallel chain loops 142 which extend between a pair of sprockets 144, 145. Chain loops 142 are driven at the same speed as chain loops 75 on accelerating deck 70 by a drive means (not shown). In some cases belts may be used in place of chain loops 142 and suitable pulleys may be used in place of sprockets 144, 145.

Accelerating deck 70 in the embodiment of FIG. 9 operates as described above. When accelerating deck 70 is in its engaged position elevated sections 80 on accelerating deck 70 project sufficiently to lift boards 15 into contact with overhead clamping deck 140. The length of elevated sections 80 on accelerating deck 70 is preferably slightly less than the width of the narrowest of boards 15 so that only one board is taken at a time. In the embodiment of FIG. 9 the control unit is set to clamp boards 15 so that the leading edge of elevated sections 80 correspond approximately with the leading edges of boards 15. Driven friction wheels 148 are provided on shaft 26 to maintain the clamping action on the trailing ends of those ones of boards 15 which are wider than elevated sections 80 after elevated sections 80 have travelled around the sprockets 79 and no longer support the board.

Figure 10:
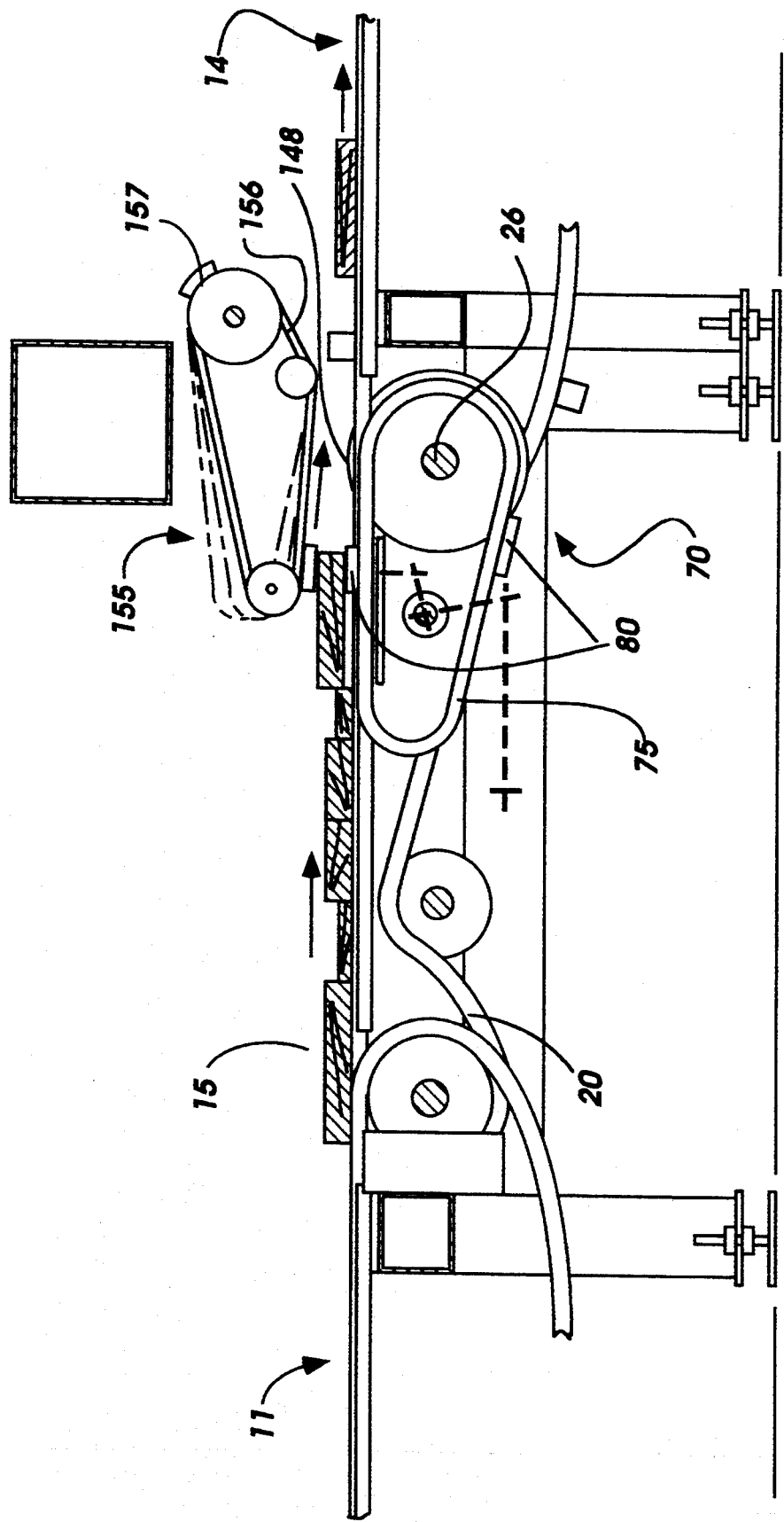
FIG. 10 is a schematic view of a third alternative embodiment of the lug loader of the invention.

FIG. 10 shows a third alternative embodiment of the invention which is adapted to load boards of various thicknesses and widths, In the embodiment of FIG. 10, press rollers 72 have been replaced with an overhead clamping deck 155. Accelerating deck 70 operates as described above. The length of elevated sections 80 on accelerating deck 70 is approximately equal to the width of the narrowest of boards 15.

Overhead clamping deck 155 is similar to overhead accelerating deck 140 which is described above with reference to FIG. 9 but the end of overhead accelerating deck 155 toward smooth transfer deck 12 is movable vertically by means of an actuator (not shown) which is controlled by a control unit (not shown). Overhead clamping deck 155 preferably comprises a number of parallel chain loops 156 bearing elevated sections 157. The operation of overhead clamping deck 155 is synchronized with the operation of acceleration deck 70 so that when elevated sections 157 on overhead clamping deck 155 are moving toward lugged transfer deck 14 they move at the same speed as those elevated sections 80 on acceleration deck 70 which are moving toward lugged transfer deck 14. Elevated sections 157 and elevated sections 80 contact the top and bottom surfaces respectively of a board being loaded. Driven friction wheels 148 are preferably provided on shaft 26 and operate as described above with reference to FIG. 9.

It can be readily appreciated that the design of a lug loader 10 according to the invention will depend on the type of lumber being handled. For example, a lug loader handling boards which come from a planer will need to be designed to minimize damage to the surfaces of the boards. Precautions to reduce such damage could include adjusting the speed of the smooth transfer deck to avoid excessive sliding of smooth deck chains 20 relative to boards 15 and designing all wood-contacting surfaces in the lug loader to minimize marking of the wood. Generally, boards which have been planed can be relied upon to be of uniform thickness.

Rough sawn boards can be treated more aggressively than planed boards. In a lug loader for handling rough sawn boards the wood contacting surfaces may include sharp teeth which slightly bite into the wood to grip boards 15 very firmly. Any marks caused by handling in the lug loader will be planed out later.

Figure 11:
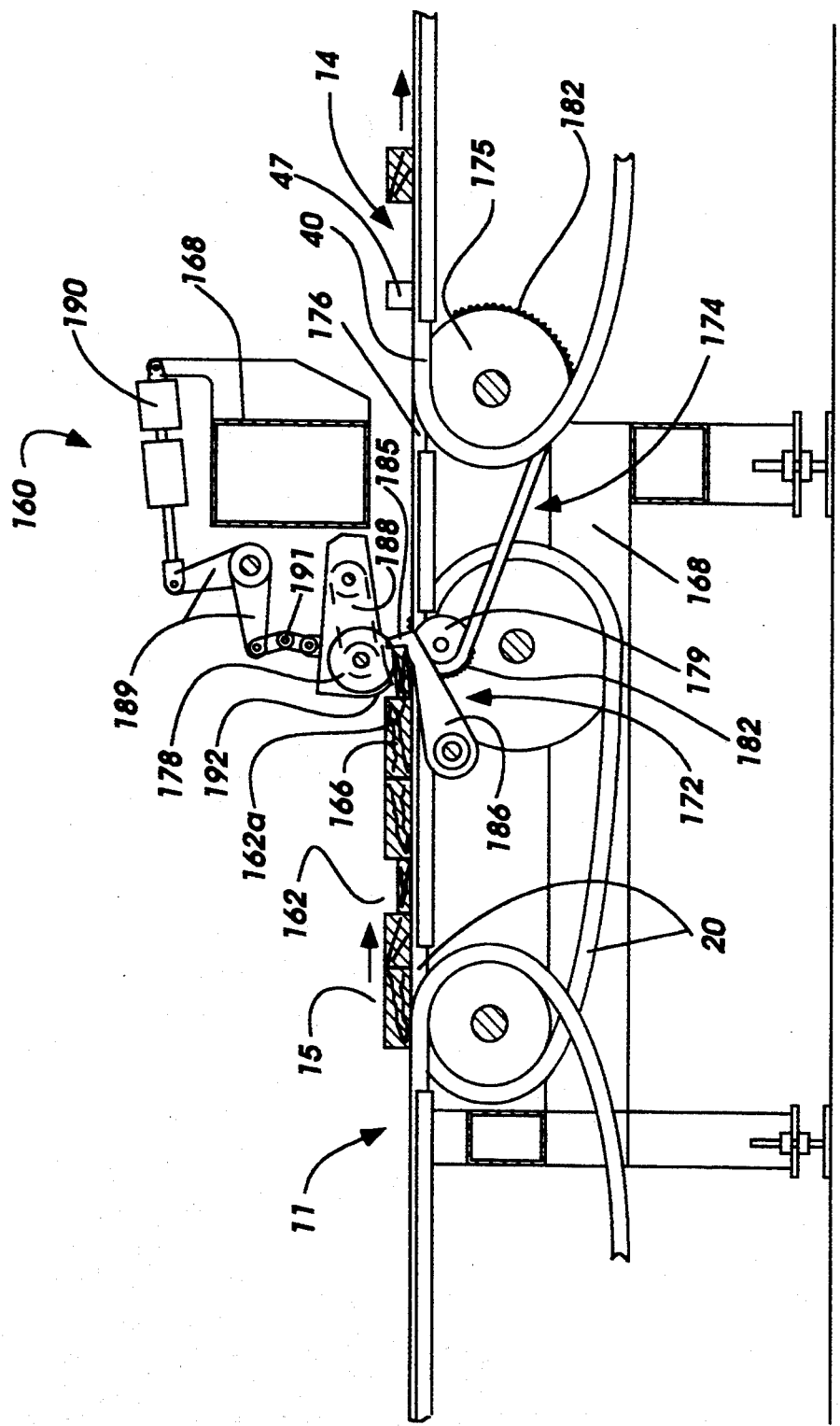
FIG. 11 is a schematic side elevational view of a fourth alternative embodiment of the lug loader of the invention.
Figure 12:
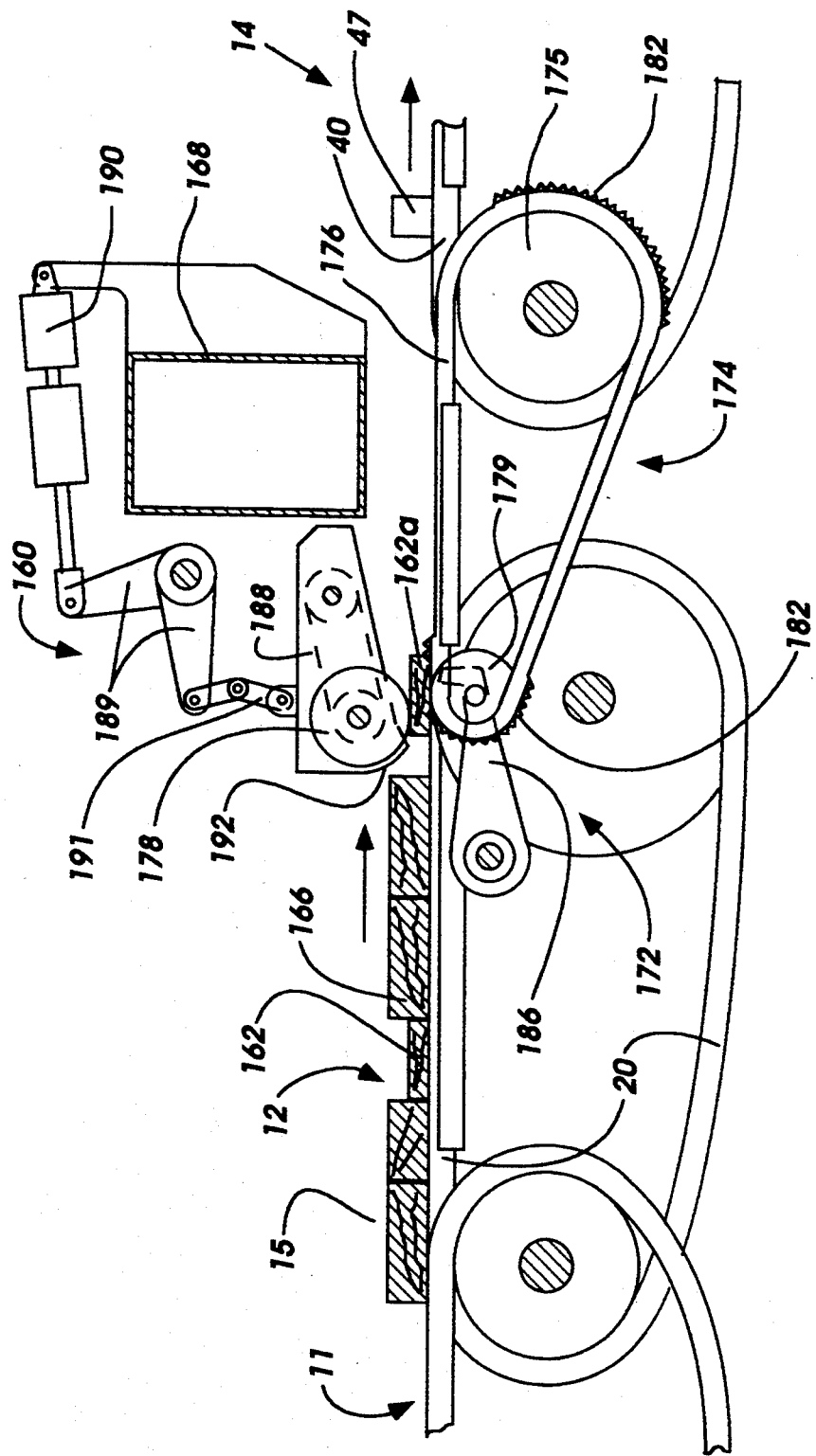
FIG. 12 is a schematic side elevational view of the alternative lug loader of FIG. 11.

FIGS. 11 and 12 show a fourth alternative embodiment of the invention adapted to load rough sawn boards of two different thicknesses and various widths onto a lugged transfer deck 14. Smooth transfer deck 12 provides lug loader 160 with a supply of thinner boards 162 which are, for example, one inch by four inch boards intermingled with thicker boards 166 which are, for example, two inch by six inch boards.

Lug loader 160 comprises a frame 168, and a stop 172, a lower accelerating deck 174, and a series of press rolls 178 which are mounted to frame 188. Lower accelerating deck 174 comprises a number of chain loops 176 which pass around sprockets 175 and 179. It is not necessary for lower accelerating deck 174 to be movable between retracted and extended positions. Lower accelerating deck 174 may be fixed in an extended position. Chain loops 176 are driven synchronously with chains 40 of lugged transfer deck 14. Chain loops 176 have a number of outwardly projecting toothed sections 182 equally spaced along their lengths. Toothed sections 182 preferably comprise serrated teeth projecting from chain loops 176. Toothed sections 182 are preferably spaced "one lug" apart in the same manner that elevated sections 80 are spaced apart on accelerator deck 70 in the embodiments of the invention described above. While it is not preferable, under some circumstances, chain loops 176 may have toothed sections 182 projecting all along their lengths without departing from the scope of the invention.

Stop 172 comprises a stop surface 185 mounted at the end of an arm 186. As shown in FIG. 12, stop 172 can be lowered by an actuating mechanism (not shown) to permit the passage of boards 162 and 166 or it can be raised as shown in FIG. 11 to block the passage of boards 162 and 166. When stop 172 is in its raised position arm 186 lifts the leading edge of the leading board 162a so that sharp sections 182 on lower accelerating deck 174 clear leading board 162a.

Press rolls 178 are mounted at one end of a frame 188. Preferably press rolls 178 are driven by a drive means of known design (not shown) so that the lowermost surfaces of press rolls 178 are moving in the direction of lugged transfer deck 14 at the same speed as toothed sections 182. Because the lumber being handled is rough sawn, press rolls 178 may be simple steel faced rollers. Any marks made on the boards by press rolls 178 will be removed when the boards are planed. A second end of frame 188 is pivotally mounted to frame 168. Frame 188 is coupled by a linkage 189 to an actuator 190 which is conveniently a pneumatic cylinder. Preferably actuator 190 can be actuated to move press rolls 178 to one of four predetermined positions. In a fully retracted position press rolls 178 are lifted well clear of smooth transfer deck chains 20. In a first intermediate position, press rolls 178 are located slightly (for example 0.75 inches) above the top surface of a thick board 166. In a second intermediate position, press rolls 178 are located slightly (for example 0.75 inches) above the top surface of a thin board 162. In their lowest position press rolls 178 would be located slightly above chains 20 of smooth transfer deck 12 if there were no board below press rolls 178. This allows press rolls 178 to bear down fully and provide maximum clamping force on waney boards. Linkage 189 and/or actuator 190 preferably include a flexible link such as link 191 or other flexible means so that the clamping force exerted by press rolls 178 on the top surface of a board 162 or 166 is more or less the same for all board thicknesses. Preferably each of press rolls 178 is individually suspended so that each of press rolls 178 can exert the same clamping force on a board regardless of the thickness of the board at the point of contact.

A second lumber stop 192 is preferably mounted to frame 188 on the side of press rolls 178 away from lugged transfer deck 14.

In operation, a cycle begins with a board 162a coming to rest against stop 172 which is in its raised position. Press rolls 178 are fully retracted. When board sensor 100 detects board 162a then the control unit (not shown) causes actuator 190 to move press rolls 178 to the appropriate intermediate position just above board 162a as determined by thickness sensor 104. When lug sensor 102 detects that lugs 47 on lugged transfer deck 14 are in the correct position then stop 172 drops to its retracted position. Because the operation of lower accelerating deck 174 is synchronized with the operation of lugged transfer deck 14 one set of toothed sections 182 will be below board 162a when stop 172 is retracted. Board 162a is therefore dropped onto toothed sections 182 on lower accelerating deck 174. Simultaneously press rolls 178 are dropped into their lowermost position. Board 162a is clamped between press rolls 178 and toothed section 182. When board 162a is moved clear of stop 172 board sensor 100 detects the gap behind board 162a and stop 172 is raised.

After board 162a has been accelerated, press rolls 178 are retracted. Board 162a is then carried to lugged transfer deck 14 by lower accelerating deck 174 essentially as described above with reference to FIGS. 1A through 1F and accelerating deck 70.

If the board following board 162a is thicker than board 162a then, if press rolls 178 were not somehow protected, the following board could come into contact with press rolls 178 before they were retracted. Second lumber stop 192 prevents the following board from coming into contact with press rolls 178. This loading process is repeated for each row of lugs 47 on lugged transfer deck 14.

The embodiment of the invention shown in FIGS. 11 and 12 could be used without press rolls 178. This is not preferable because it does not clamp boards as they are accelerated. However, it does provide some advantages over prior art lug loaders. An accelerating deck comprising chain loops having toothed sections spaced "one lug" apart is able to operate slightly faster than a prior art lug loader because it is not necessary to lift boards approaching the acceleration deck on the smooth transfer deck clear of the acceleration deck until just before the next toothed section approaches the board.

In light of the foregoing disclosure, it can be readily seen that a lug loader according to the invention and similar to the lug loader shown in FIGS. 11 and 12 may be constructed by retrofitting a driven overhead clamping means, such as a set of press rolls 178, to an existing prior art lug loader such as a lug loader of the type available from Newnes Machine Ltd. of Salmon Arm British Columbia, Canada or a POSI-LOAD ™ lug loader available from Lumber Systems Inc. of Vancouver, Wash., U.S.A.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. Apparatus for loading boards from a first position on an input deck onto a lugged transfer deck, said apparatus comprising:
   a. lower accelerating section means extending below said first position for carrying a board having an upper surface and a lower surface from said first position to said lugged transfer deck, said lower accelerating section means comprising a first board-contacting surface for carrying boards from said first position to said lugged transfer deck, said lower accelerating section means movable between a disengaged position wherein said first board-contacting surface does not contact a board at said first position and an engaged position wherein said first board-contacting surface contacts said lower surface of said board at said first position;
   b. drive means for moving first said board-contacting surface at a first velocity in a first direction from said first position toward said lugged transfer deck;
   c. actuator means associated with said lower accelerating section means for moving said lower accelerating section means between said engaged and disengaged positions; and
   d. board-pressing means above said lower accelerating section means, said board-pressing means having a second board-contacting surface for applying pressure to said upper surface of said board when said lower accelerating section means is in said engaged position, said second board-contacting surface movable in said first direction at said first velocity.

2. The apparatus of claim 1 wherein said board pressing means comprises clamp actuator means for moving said second board-contacting surface toward and away from said first board-contacting surface.

3. The apparatus of claim 2 further comprising stop means for retaining boards at said first position said stop means movable between an open position and a closed position.

4. The apparatus of claim 3 wherein said stop means comprises a stop surface and means for moving said stop surface upward to said open position wherein a board can pass beneath said stop surface and downward from said open position to said closed position wherein said stop surface blocks movement of boards past said stop surface.

5. The apparatus of claim 4 wherein said stop means comprises an arm pivotally connected at a first end to a frame of said apparatus; stop actuator means for pivoting said arm between said open and closed positions and wherein said stop surface is at a second end of said arm.

6. The apparatus of claim 5 wherein said arm extends above said first position when said stop means is in said closed position.

7. The apparatus of claim 1 further comprising second drive means for moving said second board-contacting surface at said first velocity in said first direction.

8. The apparatus of claim 7 wherein said board pressing means comprises a roller journalled for rotation in a frame and clamp actuator means for moving said frame toward and away from said lower accelerating section means.

9. The apparatus of claim 7 wherein said board pressing means comprises a frame and a plurality of chain loops on said frame, said chain loops oriented parallel to said first direction and movable in said first direction.

10. The apparatus of claim 7 wherein said board pressing means comprises a frame and a belt oriented parallel to said first direction mounted to said frame for motion in said first direction.

11. The apparatus of claim 7 wherein said board pressing means comprises a rotating drum, a lobe projecting radially from said drum, and drive means for rotating said drum in synchronization with said lower accelerating section means.

12. The apparatus of claim 1 wherein said lower accelerating section means comprises a frame, a plurality of endless loops on said frame, said endless loops oriented parallel to said first direction, and a plurality of elevated sections equally spaced along said endless loops and projecting from said endless loops, and wherein said first board-contacting surface comprises a surface of said elevated sections.

13. The apparatus of claim 12 wherein each of said endless loops comprises two elevated sections.

14. The apparatus of claim 12 wherein said drive means is adapted to move said elevated sections at said first velocity and said first velocity is such that the time taken for successive elevated sections to pass a point on said lower accelerating section means is the same as the time taken for successive lugs on said lugged transfer deck to pass a point on said lugged transfer deck.

15. The apparatus of claim 14 wherein said lugged transfer deck comprises a chain and lugs spaced M links apart on said chain; said endless loops comprise chains and said elevated sections are spaced N links apart along said endless loop chains; and said drive means comprises a shaft journalled for rotation in a frame of said apparatus, a sprocket having P teeth mounted to said shaft and driven by said lugged transfer deck chain, a drive sprocket having Q teeth mounted to said shaft, said endless loop chains passing around said drive sprocket wherein the ratio M:N is the same as the ratio P:Q.

16. The apparatus of claim 14 wherein said board pressing means comprises a frame, a plurality of chain loops on said frame, said chain loops oriented parallel to said first direction and movable in said first direction, at least two elevated sections equally spaced along said chain loops wherein said second board-contacting surface comprises a surface of said at least two elevated sections and further comprising second drive means for driving said chain loops in synchronization with said endless loops.

17. In an apparatus for loading a board having upper and lower surfaces from a first position on an input deck means onto a lugged transfer deck, said apparatus comprising: stop means movable between an engaged position and a retracted position for retaining said board at said first position until said stop means is moved to said retracted position; lower accelerating section means extending from said first position toward said lugged transfer deck for accelerating said board in said first direction, supporting said lower surface of said board, and carrying said board to said lugged transfer deck; said lower accelerating section means comprising a first board-contacting surface movable in a first direction from said first position toward said lugged transfer deck at a first velocity and drive means for moving said first board-contacting surface in said first direction at said first velocity; an improvement wherein said apparatus further comprises a second board-contacting surface movable in said first direction at said first velocity, means for bringing said second board-contacting surface into forceful engagement with said upper surface of said board, and second drive means for moving said second board-contacting surface in said first direction at said first velocity.

18. In a method for loading a board from a first position onto a lugged transfer deck, said method comprising the steps of providing a board having upper and lower surfaces at said first position; providing an accelerating section for moving said board in a first direction from said first position to said lugged transfer deck at a first velocity;, waiting until a lug of said lugged transfer deck is in a predetermined position; bringing said lower surface of said board into contact with said accelerating section, accelerating said board to said first velocity and, carrying said board to said lugged transfer deck on said first accelerating section, an improvement comprising the steps of providing a board-contacting surface moving in said first direction at said first velocity and bringing said board contacting surface into pressing contact with said upper surface of said board while said board is being accelerated on said accelerating section.

19. Apparatus for loading boards from a first position on an input deck means onto a lugged transfer deck, said lugged transfer deck comprising transverse rows of lugs and drive means for driving said rows of lugs along said lugged transfer deck at a rate such that the interval between successive sets of lugs passing a point on said lugged transfer deck is T seconds, said apparatus comprising:
 a. stop means for retaining a board at said first position when said stop means is in an engaged position, said stop means movable to a disengaged position wherein a board moving in a first direction from said first position can pass said stop means;
 b. stop actuator means for moving said stop means between said engaged and disengaged positions;
 c. lower accelerating section means for carrying boards in said first direction from said first position to said lugged transfer deck, said lower accelerating section means extending below said first position and comprising a plurality of endless loops oriented parallel to said first direction, said loops comprising at least one elevated section comprising a first board-contacting surface; and
 d. drive means for moving said loops to carry said elevated sections in said first direction from said first position at a first velocity such that one of said elevated sections passes said first position every T seconds
further comprising board pressing means above said lower accelerating section means for clamping a board between said board clamping means and said first board-contacting surface said board pressing means comprising a support member mounted to a frame of said apparatus; a second board-contacting surface coupled to said frame and movable in said first direction at said first velocity; and clamp actuator means for moving said support member and said second board-contacting surface between a retracted position away from said lower accelerating section means and an engaged position toward said lower accelerating section means.

20. The apparatus of claim 19 further comprising a thickness sensor for detecting the position of the upper surface of a board at said first position and control means associated with said thickness sensor for operating said clamp actuator means to move said second board-contacting surface to an intermediate position adjacent but not touching said upper surface of said board and to subsequently move said second board-contacting surface to said engaged position wherein said second board-contacting surface is pressing on said upper surface of said board.

21. The apparatus of claim 19 further comprising second stop means actuated by said clamp actuator means above and on a first side of said second board-contacting surface wherein said clamp actuator means moves said second stop means to an open position when said support member is in said retracted position and an closed position when said support member is in said engaged position.

22. The apparatus of claim 19 further comprising a first detector for detecting a board at said first position, second detector means for detecting when said first board-contacting surface is below said first position and control means operatively associated with said first detector and said second detector means, said control means adapted to operate said stop actuator means to move said stop means to said disengaged position and to operate said clamp actuator means to move said second board-contacting surface to said engaged position when a board is present at said first position and said first board-contacting means is below said first position.

23. The apparatus of claim 19 wherein said second board-contacting surface comprises a lower surface of the periphery of a press roller journalled for rotation in said support member.

24. The apparatus of claim 19 further comprising second drive means for moving said second board-contacting surface in said first direction at said first velocity.

25. A lumber handling system comprising:
 a. a smooth transfer deck;
 b. a lugged transfer deck comprising a plurality of transverse rows of lugs and drive means for moving said rows of lugs along said lugged transfer deck;
 c. a lug loader between said smooth and lugged transfer decks said lug loader comprising an accelerating section extending from said smooth transfer deck to said lugged transfer deck; a press roller spaced above said accelerating section; a gap between said press roller and said accelerating section; and actuator means for reducing said gap to clamp a board between said press roller and said accelerating section, said accelerating section comprising a board contacting surface and drive means for moving said board-contacting surface in a first direction toward said lugged transfer deck;
 d. first stop means for selectively blocking a board on said smooth transfer deck from entering said accelerating section; and,
 e. second stop means operatively associated with said actuator means, on a side of said press roller toward said smooth transfer deck, said second stop means movable with said press roller relative to said accelerating section, said press roller projecting past said second stop means toward said accelerating section.

26. The lumber handling system of claim 25 further comprising drive means for rotating said press roller about an axis in a sense such that a lower circumferential portion of said press roller moves toward said lugged transfer deck.

27. Apparatus for loading a board having an upper surface and a lower surface from a first position on an input deck means onto a lugged transfer deck comprising transverse rows of lugs and drive means for driving said rows of lugs along said lugged transfer deck at a rate such that the interval between successive sets of lugs passing a point on said lugged transfer deck is T seconds, said apparatus comprising:
   a. stop means for retaining a board at said first position when said stop means is in an engaged position, said stop means movable to a disengaged position wherein a board moving in a first direction from said first position can pass said stop means;
   b. stop actuator means for moving said stop means between said engaged and disengaged positions;
   c. lower accelerating section means for carrying boards in said first direction from said first position to said lugged transfer deck, said lower accelerating section means extending below said first position and comprising a plurality of endless chain loops oriented parallel to said first direction, said chain loops comprising a plurality of outwardly projecting sharpened teeth;
   d. control means associated with said stop actuator means to repeatedly every T seconds move said stop means from said engaged position, to said disengaged position, to retain said stop means in said disengaged position for sufficient time for a board to be carried past said stop by said lower accelerating section means and to move said stop means to said disengaged position further comprising board pressing means above said lower accelerating section means for clamping said board between said board pressing means and said sharpened teeth, said board pressing means comprising a support member mounted to a frame of said apparatus; a board-contacting surface coupled to said frame and movable in said first direction at a first velocity; and clamp actuator means for moving said support member and said second board-contacting surface between a retracted position away from said lower accelerating section means and an engaged position toward said lower accelerating section means.

28. The apparatus of claim 27 further comprising a thickness sensor for detecting the position of said upper surface of said board at said first position and control means associated with said thickness sensor for operating said clamp actuator means to move said second board-contacting surface to an intermediate position adjacent but not touching said upper surface of said board and to subsequently move said second board-contacting surface to said engaged position wherein said second board-contacting surface is pressing on said upper surface of said board.

29. The apparatus of claim 27 further comprising a second stop means on said support member on a first side of said second board-contacting surface.

30. The apparatus of claim 27 wherein said second board-contacting surface comprises a lower surface of the periphery of a press roller journalled for rotation in said support member.

31. The apparatus of claim 27 further comprising a first detector for detecting a board at said first position, second detector means for detecting when said first board-contacting surface is below said first position and control means operatively associated with said first detector and said second detector means, said control means adapted to operate said stop actuator means to move said stop means to said disengaged position and to operate said clamp actuator means to move said second board-contacting surface to said engaged position when a board is present at said first position and said first board-contacting means is below said first position.

32. The apparatus of claim 27 further comprising second drive means for moving said second board-contacting surface in said first direction at said first velocity.

33. A method for loading a board from a first position onto a lugged transfer deck, said method comprising the steps of:
   a. providing a board at said first position;
   b. providing an accelerating section comprising a first board-contacting surface, said first board-contacting surface movable in a first direction on a first side of said first position and a board pressing member comprising a second board-contacting surface movable in said first direction on a second side of said first position;
   c. waiting until a lug of said lugged transfer deck is in a predetermined position;
   d. raising said accelerating section to grip said board between said first and second board-contacting surfaces;
   e. accelerating said board while it is between first and second board-contacting surfaces; and
   f. carrying said board to said lugged transfer deck on said first board-contacting surface.

34. The method of claim 33 wherein said step of providing a board at said first position comprises accumulating a plurality of boards behind a stop at said first position and further comprising the step of retracting said stop immediately before step (d).

35. The method of claim 34 wherein said step of retracting said stop comprises raising said stop to allow said board to pass beneath said stop.

36. The method of claim 33 wherein step (d) further comprises moving said board pressing member toward said accelerating section.

37. The method of claim 36 further comprising the step of moving said board clamping member away from said accelerating section after step (e).

38. The method of claim 37 further comprising the step of moving said board clamping member toward said accelerating section to an intermediate position in which said clamping member is not touching said board immediately before step (d).

39. The method of claim 38 further comprising the step of measuring the thickness of said board before said step of moving said board clamping member toward said accelerating section to an intermediate position.

40. The method of claim 39 wherein said step (c) further comprises monitoring said first position to determine when a board is present at said first position and waiting until a board is present at said first position.

* * * * *